US012646268B2

(12) United States Patent      (10) Patent No.:  US 12,646,268 B2
Assouline et al.                    (45) Date of Patent:     \*Jun. 2, 2026

(54) REAL-TIME UPPER-BODY GARMENT EXCHANGE

(71) Applicant: Snap Inc., Santa Monica, CA (US)

(72) Inventors: Avihay Assouline, Tel Aviv (IL); Itamar Berger, Hod Hasharon (IL); Nir Malbin, Shoham (IL); Gal Sasson, Kibbutz Ayyelet Hashahar (IL)

(73) Assignee: Snap Inc., Santa Monica, CA (US)

( \* ) Notice: Subject to any disclaimer, the term of this patent is extended or adjusted under 35 U.S.C. 154(b) by 194 days.

This patent is subject to a terminal disclaimer.

(21) Appl. No.: 18/525,285

(22) Filed: Nov. 30, 2023

(65) Prior Publication Data

US 2024/0096040 A1      Mar. 21, 2024

Related U.S. Application Data

(63) Continuation of application No. 17/557,277, filed on Dec. 21, 2021, now Pat. No. 11,880,947.

(51) Int. Cl.
G06T 19/00       (2011.01)
G06T 7/215       (2017.01)
(Continued)

(52) U.S. Cl.
CPC ............ G06T 19/006 (2013.01); G06T 7/215 (2017.01); G06T 7/70 (2017.01); G06T 19/20 (2013.01)

(58) Field of Classification Search
CPC .............................. G06T 19/006; G06T 19/20
See application file for complete search history.

(56) References Cited

U.S. PATENT DOCUMENTS 5,604,843 A      2/1997  Shaw et al.
5,689,559 A     11/1997  Park
(Continued)

FOREIGN PATENT DOCUMENTS

CA          2887596 A1     7/2015
CN        109863532 A      6/2019
(Continued)

OTHER PUBLICATIONS

"U.S. Appl. No. 16/269,312, Examiner Interview Summary mailed Jun. 24, 2020", 3 pgs.
(Continued)

*Primary Examiner* — Charles Tseng
(74) *Attorney, Agent, or Firm* — Schwegman Lundberg & Woessner, P.A.

(57)          ABSTRACT

Methods and systems are disclosed for performing operations for transferring garments from one real-world object to another in real time. The operations comprise receiving a first video that includes a depiction of a first person wearing a first upper-body garment in a first pose and obtaining a second video that includes a depiction of a second person wearing a second upper-body garment in a second pose. A pose of the second person depicted in the second video is modified to match the first pose of the first person depicted in the first video. The operations comprise generating an upper-body segmentation of the second upper-body garment which the second person is wearing in the second video in the modified pose and replacing the first upper-body garment worn by the first person in the first video with the second upper-body garment based on the upper-body segmentation.

20 Claims, 10 Drawing Sheets

(51) Int. Cl.
    *G06T 7/70*          (2017.01)
    *G06T 19/20*       (2011.01)

(56)            References Cited

U.S. PATENT DOCUMENTS

| | | | |
|---|---|---|---|
| 5,880,731 | A | 3/1999 | Liles et al. |
| 6,020,891 | A | 2/2000 | Rekimoto |
| 6,023,270 | A | 2/2000 | Brush, II et al. |
| 6,038,295 | A | 3/2000 | Mattes |
| RE36,919 | E | 10/2000 | Park |
| RE37,052 | E | 2/2001 | Park |
| 6,223,165 | B1 | 4/2001 | Lauffer |
| 6,650,793 | B1 | 11/2003 | Lund et al. |
| 6,753,863 | B1 | 6/2004 | Winkler et al. |
| 6,772,195 | B1 | 8/2004 | Hatlelid et al. |
| 6,804,417 | B1 | 10/2004 | Lund et al. |
| 6,842,779 | B1 | 1/2005 | Nishizawa |
| 6,980,909 | B2 | 12/2005 | Root et al. |
| 7,173,651 | B1 | 2/2007 | Knowles |
| 7,342,587 | B2 | 3/2008 | Danzig et al. |
| 7,411,493 | B2 | 8/2008 | Smith |
| 7,468,729 | B1 | 12/2008 | Levinson |
| 7,535,890 | B2 | 5/2009 | Rojas |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,088,044 | B2 | 1/2012 | Tchao et al. |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,131,597 | B2 | 3/2012 | Hudetz |
| 8,146,005 | B2 | 3/2012 | Jones et al. |
| 8,151,191 | B2 | 4/2012 | Nicol |
| 8,199,747 | B2 | 6/2012 | Rojas et al. |
| 8,253,746 | B2 | 8/2012 | Geisner et al. |
| 8,332,475 | B2 | 12/2012 | Rosen et al. |
| RE43,993 | E | 2/2013 | Park |
| 8,384,719 | B2 | 2/2013 | Reville et al. |
| RE44,054 | E | 3/2013 | Kim |
| RE44,068 | E | 3/2013 | Park |
| RE44,106 | E | 3/2013 | Park |
| 8,396,708 | B2 | 3/2013 | Park et al. |
| RE44,121 | E | 4/2013 | Park |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,581,911 | B2 | 11/2013 | Becker et al. |
| 8,597,121 | B2 | 12/2013 | Andres del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,633,913 | B1 | 1/2014 | Raghu et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,718,333 | B2 | 5/2014 | Wolf et al. |
| 8,724,622 | B2 | 5/2014 | Rojas |
| 8,730,156 | B2 | 5/2014 | Weising et al. |
| 8,749,557 | B2 | 6/2014 | Evertt et al. |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,874,677 | B2 | 10/2014 | Rosen et al. |
| 8,890,926 | B2 | 11/2014 | Tandon et al. |
| 8,892,999 | B2 | 11/2014 | Nims et al. |
| 8,909,679 | B2 | 12/2014 | Root et al. |
| 8,924,250 | B2 | 12/2014 | Bates et al. |
| 8,952,969 | B2 | 2/2015 | Isner |
| 8,963,926 | B2 | 2/2015 | Brown et al. |
| 8,989,786 | B2 | 3/2015 | Feghali |
| 8,995,433 | B2 | 3/2015 | Rojas |
| 9,040,574 | B2 | 5/2015 | Wang et al. |
| 9,055,416 | B2 | 6/2015 | Rosen et al. |
| 9,086,776 | B2 | 7/2015 | Ye et al. |
| 9,100,806 | B2 | 8/2015 | Rosen et al. |
| 9,100,807 | B2 | 8/2015 | Rosen et al. |
| 9,105,014 | B2 | 8/2015 | Collet et al. |
| 9,191,776 | B2 | 11/2015 | Root et al. |
| 9,196,094 | B2 | 11/2015 | Ur |
| 9,204,252 | B2 | 12/2015 | Root |
| 9,241,184 | B2 | 1/2016 | Weerasinghe |
| 9,256,860 | B2 | 2/2016 | Herger et al. |
| 9,298,257 | B2 | 3/2016 | Hwang et al. |
| 9,314,692 | B2 | 4/2016 | Konoplev et al. |
| 9,330,483 | B2 | 5/2016 | Du et al. |
| 9,357,174 | B2 | 5/2016 | Li et al. |
| 9,361,510 | B2 | 6/2016 | Yao et al. |
| 9,378,576 | B2 | 6/2016 | Bouaziz et al. |
| 9,402,057 | B2 | 7/2016 | Kaytaz et al. |
| 9,412,192 | B2 | 8/2016 | Mandel et al. |
| 9,443,227 | B2 | 9/2016 | Evans et al. |
| 9,460,541 | B2 | 10/2016 | Li et al. |
| 9,489,661 | B2 | 11/2016 | Evans et al. |
| 9,489,760 | B2 | 11/2016 | Li et al. |
| 9,491,134 | B2 | 11/2016 | Rosen et al. |
| 9,503,845 | B2 | 11/2016 | Vincent |
| 9,508,197 | B2 | 11/2016 | Quinn et al. |
| 9,517,403 | B1 | 12/2016 | Kim et al. |
| 9,532,364 | B2 | 12/2016 | Fujito |
| 9,544,257 | B2 | 1/2017 | Ogundokun et al. |
| 9,576,400 | B2 | 2/2017 | Van Os et al. |
| 9,589,357 | B2 | 3/2017 | Li et al. |
| 9,592,449 | B2 | 3/2017 | Barbalet et al. |
| 9,633,447 | B2 | 4/2017 | Swaminathan et al. |
| 9,645,394 | B2 | 5/2017 | Kinnebrew et al. |
| 9,648,376 | B2 | 5/2017 | Chang et al. |
| 9,652,897 | B2 | 5/2017 | Osborn et al. |
| 9,697,635 | B2 | 7/2017 | Quinn et al. |
| 9,706,040 | B2 | 7/2017 | Kadirvel et al. |
| 9,744,466 | B2 | 8/2017 | Fujioka |
| 9,746,990 | B2 | 8/2017 | Anderson et al. |
| 9,749,270 | B2 | 8/2017 | Collet et al. |
| 9,792,714 | B2 | 10/2017 | Li et al. |
| 9,839,844 | B2 | 12/2017 | Dunstan et al. |
| 9,883,838 | B2 | 2/2018 | Kaleal, III et al. |
| 9,898,849 | B2 | 2/2018 | Du et al. |
| 9,911,073 | B1 | 3/2018 | Spiegel et al. |
| 9,936,165 | B2 | 4/2018 | Li et al. |
| 9,959,037 | B2 | 5/2018 | Chaudhri et al. |
| 9,980,100 | B1 | 5/2018 | Charlton et al. |
| 9,990,373 | B2 | 6/2018 | Fortkort |
| 10,039,988 | B2 | 8/2018 | Lobb et al. |
| 10,097,492 | B2 | 10/2018 | Tsuda et al. |
| 10,116,598 | B2 | 10/2018 | Tucker et al. |
| 10,134,296 | B2 | 11/2018 | Anderson et al. |
| 10,155,168 | B2 | 12/2018 | Blackstock et al. |
| 10,158,589 | B2 | 12/2018 | Collet et al. |
| 10,173,141 | B1 | 1/2019 | Schindler et al. |
| 10,242,477 | B1 | 3/2019 | Charlton et al. |
| 10,242,503 | B2 | 3/2019 | McPhee et al. |
| 10,262,250 | B1 | 4/2019 | Spiegel et al. |
| 10,325,416 | B1 | 6/2019 | Scapel et al. |
| 10,348,662 | B2 | 7/2019 | Baldwin et al. |
| 10,362,219 | B2 | 7/2019 | Wilson et al. |
| 10,432,559 | B2 | 10/2019 | Baldwin et al. |
| 10,454,857 | B1 | 10/2019 | Blackstock et al. |
| 10,475,225 | B2 | 11/2019 | Park et al. |
| 10,504,266 | B2 | 12/2019 | Blattner et al. |
| 10,573,048 | B2 | 2/2020 | Ni et al. |
| 10,656,797 | B1 | 5/2020 | Alvi et al. |

(56) References Cited

U.S. PATENT DOCUMENTS

| | | | |
|---|---|---|---|
| 10,657,695 | B2 | 5/2020 | Chand et al. |
| 10,657,701 | B2 | 5/2020 | Osman et al. |
| 10,740,978 | B2 | 8/2020 | McPhee et al. |
| 10,762,174 | B2 | 9/2020 | Denton et al. |
| 10,805,248 | B2 | 10/2020 | Luo et al. |
| 10,872,451 | B2 | 12/2020 | Sheth et al. |
| 10,880,246 | B2 | 12/2020 | Baldwin et al. |
| 10,895,964 | B1 | 1/2021 | Grantham et al. |
| 10,896,534 | B1 | 1/2021 | Smith et al. |
| 10,933,311 | B2 | 3/2021 | Brody et al. |
| 10,938,758 | B2 | 3/2021 | Allen et al. |
| 10,964,082 | B2 | 3/2021 | Amitay et al. |
| 10,979,752 | B1 | 4/2021 | Brody et al. |
| 10,984,575 | B2 | 4/2021 | Assouline et al. |
| 10,992,619 | B2 | 4/2021 | Antmen et al. |
| 11,010,022 | B2 | 5/2021 | Alvi et al. |
| 11,030,789 | B2 | 6/2021 | Chand et al. |
| 11,036,781 | B1 | 6/2021 | Baril et al. |
| 11,063,891 | B2 | 7/2021 | Voss |
| 11,069,103 | B1 | 7/2021 | Blackstock et al. |
| 11,080,917 | B2 | 8/2021 | Monroy-hernández et al. |
| 11,128,586 | B2 | 9/2021 | Al Majid et al. |
| 11,188,190 | B2 | 11/2021 | Blackstock et al. |
| 11,189,070 | B2 | 11/2021 | Jahangiri et al. |
| 11,199,957 | B1 | 12/2021 | Alvi et al. |
| 11,210,834 | B1 | 12/2021 | Chamdani et al. |
| 11,218,433 | B2 | 1/2022 | Baldwin et al. |
| 11,229,849 | B2 | 1/2022 | Blackstock et al. |
| 11,245,658 | B2 | 2/2022 | Grantham et al. |
| 11,249,614 | B2 | 2/2022 | Brody |
| 11,263,254 | B2 | 3/2022 | Baril et al. |
| 11,270,491 | B2 | 3/2022 | Monroy-Hernández et al. |
| 11,284,144 | B2 | 3/2022 | Kotsopoulos et al. |
| 11,450,051 | B2 | 9/2022 | Assouline et al. |
| 11,557,075 | B2 | 1/2023 | Assouline et al. |
| 11,615,592 | B2 | 3/2023 | Assouline et al. |
| 11,660,022 | B2 | 5/2023 | Assouline et al. |
| 11,734,894 | B2 | 8/2023 | Assouline et al. |
| 11,748,931 | B2 | 9/2023 | Assouline et al. |
| 11,880,947 | B2 | 1/2024 | Assouline et al. |
| 12,198,398 | B2 | 1/2025 | Assouline et al. |
| 12,223,672 | B2 | 2/2025 | Assouline et al. |
| 12,243,173 | B2 | 3/2025 | Assouline et al. |
| 2002/0067362 | A1 | 6/2002 | Agostino Nocera et al. |
| 2002/0135581 | A1 | 9/2002 | Russell et al. |
| 2002/0169644 | A1 | 11/2002 | Greene |
| 2004/0212630 | A1 | 10/2004 | Hobgood et al. |
| 2005/0041842 | A1 | 2/2005 | Frakes et al. |
| 2005/0162419 | A1 | 7/2005 | Kim et al. |
| 2005/0206610 | A1 | 9/2005 | Cordelli |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2007/0230747 | A1 | 10/2007 | Dunko |
| 2007/0279419 | A1 | 12/2007 | Seebach |
| 2008/0078758 | A1 | 4/2008 | Shimura et al. |
| 2008/0158222 | A1 | 7/2008 | Li et al. |
| 2009/0016617 | A1 | 1/2009 | Bregman-amitai et al. |
| 2009/0055484 | A1 | 2/2009 | Vuong et al. |
| 2009/0070688 | A1 | 3/2009 | Gyorfi et al. |
| 2009/0099925 | A1 | 4/2009 | Mehta et al. |
| 2009/0106672 | A1 | 4/2009 | Burstrom |
| 2009/0158170 | A1 | 6/2009 | Narayanan et al. |
| 2009/0160779 | A1 | 6/2009 | Crockett et al. |
| 2009/0177976 | A1 | 7/2009 | Bokor et al. |
| 2009/0202114 | A1 | 8/2009 | Morin et al. |
| 2009/0265604 | A1 | 10/2009 | Howard et al. |
| 2009/0300525 | A1 | 12/2009 | Jolliff et al. |
| 2009/0303984 | A1 | 12/2009 | Clark et al. |
| 2010/0011422 | A1 | 1/2010 | Mason et al. |
| 2010/0023885 | A1 | 1/2010 | Reville et al. |
| 2010/0115426 | A1 | 5/2010 | Liu et al. |
| 2010/0162149 | A1 | 6/2010 | Sheleheda et al. |
| 2010/0203968 | A1 | 8/2010 | Gill et al. |
| 2010/0227682 | A1 | 9/2010 | Reville et al. |
| 2010/0251101 | A1 | 9/2010 | Haussecker et al. |
| 2010/0281432 | A1 | 11/2010 | Geisner et al. |
| 2010/0302138 | A1 | 12/2010 | Poot et al. |
| 2010/0302253 | A1 | 12/2010 | Kipman et al. |
| 2011/0007079 | A1 | 1/2011 | Perez et al. |
| 2011/0093780 | A1 | 4/2011 | Dunn |
| 2011/0115798 | A1 | 5/2011 | Nayar et al. |
| 2011/0148864 | A1 | 6/2011 | Lee et al. |
| 2011/0161242 | A1 | 6/2011 | Chung et al. |
| 2011/0183732 | A1 | 7/2011 | Block et al. |
| 2011/0202598 | A1 | 8/2011 | Evans et al. |
| 2011/0216060 | A1 | 9/2011 | Weising et al. |
| 2011/0239136 | A1 | 9/2011 | Goldman et al. |
| 2012/0038628 | A1 | 2/2012 | Corazza et al. |
| 2012/0113106 | A1 | 5/2012 | Choi et al. |
| 2012/0124458 | A1 | 5/2012 | Cruzada |
| 2012/0130717 | A1 | 5/2012 | Xu et al. |
| 2012/0147014 | A1 | 6/2012 | Lee |
| 2012/0188257 | A1 | 7/2012 | Girard |
| 2012/0194549 | A1 | 8/2012 | Osterhout et al. |
| 2012/0209924 | A1 | 8/2012 | Evans et al. |
| 2012/0214594 | A1 | 8/2012 | Kirovski et al. |
| 2013/0021373 | A1 | 1/2013 | Vaught et al. |
| 2013/0050258 | A1 | 2/2013 | Liu et al. |
| 2013/0091206 | A1 | 4/2013 | Moraes et al. |
| 2013/0103760 | A1 | 4/2013 | Golding et al. |
| 2013/0127980 | A1 | 5/2013 | Haddick et al. |
| 2013/0141434 | A1 | 6/2013 | Sugden et al. |
| 2013/0201187 | A1 | 8/2013 | Tong et al. |
| 2013/0249948 | A1 | 9/2013 | Reitan |
| 2013/0257877 | A1 | 10/2013 | Davis |
| 2013/0278631 | A1 | 10/2013 | Border et al. |
| 2013/0290876 | A1 | 10/2013 | Anderson et al. |
| 2014/0028713 | A1 | 1/2014 | Keating et al. |
| 2014/0043329 | A1 | 2/2014 | Wang et al. |
| 2014/0055554 | A1 | 2/2014 | Du et al. |
| 2014/0078176 | A1 | 3/2014 | Kim et al. |
| 2014/0125678 | A1 | 5/2014 | Wang et al. |
| 2014/0129343 | A1 | 5/2014 | Finster et al. |
| 2014/0176608 | A1 | 6/2014 | Boysen et al. |
| 2014/0253431 | A1 | 9/2014 | Gossweiler, III et al. |
| 2014/0282223 | A1 | 9/2014 | Bastien et al. |
| 2014/0321702 | A1 | 10/2014 | Schmalstieg |
| 2014/0331149 | A1 | 11/2014 | Labey |
| 2014/0351758 | A1 | 11/2014 | Yoshida |
| 2015/0042663 | A1 | 2/2015 | Mandel et al. |
| 2015/0098614 | A1 | 4/2015 | Gee et al. |
| 2015/0154782 | A1 | 6/2015 | Geisner et al. |
| 2015/0206349 | A1 | 7/2015 | Rosenthal et al. |
| 2015/0262029 | A1 | 9/2015 | Pirchheim et al. |
| 2015/0264304 | A1 | 9/2015 | Chastney et al. |
| 2015/0269783 | A1 | 9/2015 | Yun |
| 2015/0286829 | A1 | 10/2015 | Amacker et al. |
| 2015/0309563 | A1 | 10/2015 | Connor |
| 2015/0371447 | A1 | 12/2015 | Yasutake |
| 2016/0025978 | A1 | 1/2016 | Mallinson |
| 2016/0063600 | A1 | 3/2016 | Wuang |
| 2016/0109940 | A1 | 4/2016 | Lyren et al. |
| 2016/0134840 | A1 | 5/2016 | Mcculloch |
| 2016/0171739 | A1 | 6/2016 | Anderson et al. |
| 2016/0202755 | A1 | 7/2016 | Connor |
| 2016/0210780 | A1 | 7/2016 | Paulovich et al. |
| 2016/0234149 | A1 | 8/2016 | Tsuda et al. |
| 2016/0247309 | A1 | 8/2016 | Li et al. |
| 2016/0267699 | A1 | 9/2016 | Borke et al. |
| 2016/0330522 | A1 | 11/2016 | Newell et al. |
| 2016/0360115 | A1 | 12/2016 | Rim |
| 2017/0038829 | A1 | 2/2017 | Lanier et al. |
| 2017/0039986 | A1 | 2/2017 | Lanier et al. |
| 2017/0069134 | A1 | 3/2017 | Shapira et al. |
| 2017/0080346 | A1 | 3/2017 | Abbas |
| 2017/0084070 | A1 | 3/2017 | Chamdani et al. |
| 2017/0087473 | A1 | 3/2017 | Siegel et al. |
| 2017/0090747 | A1 | 3/2017 | Dash |
| 2017/0113140 | A1 | 4/2017 | Blackstock et al. |
| 2017/0118145 | A1 | 4/2017 | Aittoniemi et al. |
| 2017/0131781 | A1 | 5/2017 | Buban |
| 2017/0178272 | A1 | 6/2017 | Lashkari et al. |

(56) References Cited

U.S. PATENT DOCUMENTS

| | | |
|---|---|---|
| 2017/0199855 A1 | 7/2017 | Fishbeck |
| 2017/0206695 A1 | 7/2017 | Kim et al. |
| 2017/0221272 A1 | 8/2017 | Li et al. |
| 2017/0229153 A1 | 8/2017 | Moore et al. |
| 2017/0235848 A1 | 8/2017 | Van Deusen et al. |
| 2017/0255450 A1 | 9/2017 | Mullins et al. |
| 2017/0287060 A1 | 10/2017 | Choi et al. |
| 2017/0310934 A1 | 10/2017 | Du et al. |
| 2017/0312634 A1 | 11/2017 | Ledoux et al. |
| 2017/0329488 A1 | 11/2017 | Welker et al. |
| 2017/0361225 A1 | 12/2017 | Goslin et al. |
| 2018/0040166 A1 | 2/2018 | Jayaraj et al. |
| 2018/0047200 A1 | 2/2018 | O'hara et al. |
| 2018/0061072 A1 | 3/2018 | Benezra et al. |
| 2018/0082430 A1 | 3/2018 | Sharma et al. |
| 2018/0095542 A1 | 4/2018 | Mallinson |
| 2018/0108179 A1 | 4/2018 | Tomlin et al. |
| 2018/0113587 A1 | 4/2018 | Allen et al. |
| 2018/0114365 A1 | 4/2018 | Egri et al. |
| 2018/0115503 A1 | 4/2018 | Baldwin et al. |
| 2018/0143950 A1 | 5/2018 | Al-arnaouti et al. |
| 2018/0197343 A1 | 7/2018 | Hare et al. |
| 2018/0198743 A1 | 7/2018 | Blackstock et al. |
| 2018/0210628 A1 | 7/2018 | Mcphee et al. |
| 2018/0253897 A1 | 9/2018 | Satake |
| 2018/0285647 A1 | 10/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0322680 A1 | 11/2018 | Mcelmurray et al. |
| 2018/0349451 A1 | 12/2018 | O'connell et al. |
| 2019/0001223 A1 | 1/2019 | Blackstock et al. |
| 2019/0004688 A1 | 1/2019 | Bowen |
| 2019/0011703 A1 | 1/2019 | Robaina et al. |
| 2019/0038187 A1 | 2/2019 | Latella, Jr. |
| 2019/0057616 A1 | 2/2019 | Cohen et al. |
| 2019/0097958 A1 | 3/2019 | Collet et al. |
| 2019/0107991 A1 | 4/2019 | Spivack et al. |
| 2019/0188920 A1 | 6/2019 | Mcphee et al. |
| 2019/0196663 A1 | 6/2019 | Monastyrshyn et al. |
| 2019/0255419 A1 | 8/2019 | Reilly et al. |
| 2019/0280997 A1 | 9/2019 | Baldwin et al. |
| 2019/0304189 A1 | 10/2019 | Falstrup et al. |
| 2019/0369836 A1 | 12/2019 | Faulkner et al. |
| 2019/0371080 A1 | 12/2019 | Sminchisescu et al. |
| 2019/0385374 A1 | 12/2019 | Kamhi et al. |
| 2019/0385378 A1 | 12/2019 | Bastian et al. |
| 2020/0063334 A1 | 2/2020 | Schultz et al. |
| 2020/0066014 A1 | 2/2020 | Mehta et al. |
| 2020/0074738 A1 | 3/2020 | Hare et al. |
| 2020/0105006 A1 | 4/2020 | Karsch et al. |
| 2020/0105041 A1 | 4/2020 | Garofalo et al. |
| 2020/0118343 A1 | 4/2020 | Koblin et al. |
| 2020/0134898 A1 | 4/2020 | Sheth et al. |
| 2020/0197744 A1 | 6/2020 | Schweighofer |
| 2020/0202632 A1 | 6/2020 | Goodrich et al. |
| 2020/0241299 A1 | 7/2020 | Nuber et al. |
| 2020/0241729 A1 | 7/2020 | Schneider et al. |
| 2020/0242833 A1 | 7/2020 | Kuo |
| 2020/0250874 A1 | 8/2020 | Assouline et al. |
| 2020/0265234 A1 | 8/2020 | Lee et al. |
| 2020/0306637 A1 | 10/2020 | Baldwin et al. |
| 2020/0327734 A1 | 10/2020 | Goodrich et al. |
| 2020/0341580 A1 | 10/2020 | Rosenbaum et al. |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0150806 A1 | 5/2021 | Guler et al. |
| 2021/0166459 A1 | 6/2021 | Miller, IV |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0201002 A1 | 7/2021 | Watanabe et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281802 A1 | 9/2021 | Kirisken |
| 2021/0281897 A1 | 9/2021 | Brody et al. |
| 2021/0285774 A1 | 9/2021 | Collins et al. |
| 2021/0298868 A1 | 9/2021 | Rydberg |
| 2021/0306290 A1 | 9/2021 | Voss |
| 2021/0306451 A1 | 9/2021 | Heikkinen et al. |
| 2021/0383607 A1 | 12/2021 | Meng et al. |
| 2021/0385180 A1 | 12/2021 | Al Majid et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0028178 A1 | 1/2022 | Price et al. |
| 2022/0125337 A1 | 4/2022 | Assouline et al. |
| 2022/0130115 A1 | 4/2022 | Assouline et al. |
| 2022/0156999 A1 | 5/2022 | Assouline et al. |
| 2022/0157000 A1 | 5/2022 | Assouline et al. |
| 2022/0157025 A1 | 5/2022 | Assouline et al. |
| 2022/0207770 A1 | 6/2022 | Liu et al. |
| 2022/0383577 A1 | 12/2022 | Assouline et al. |
| 2023/0090086 A1 | 3/2023 | Assouline et al. |
| 2023/0154088 A1 | 5/2023 | Duarte et al. |
| 2023/0154121 A1 | 5/2023 | Assouline et al. |
| 2023/0196602 A1 | 6/2023 | Assouline et al. |
| 2023/0196685 A1 | 6/2023 | Assouline et al. |
| 2023/0196712 A1 | 6/2023 | Assouline et al. |
| 2025/0139813 A1 | 5/2025 | Assouline et al. |
| 2025/0173985 A1 | 5/2025 | Assouline et al. |

FOREIGN PATENT DOCUMENTS

| | | |
|---|---|---|
| CN | 110168478 A | 8/2019 |
| CN | 113383369 A | 9/2021 |
| CN | 116420168 A | 7/2023 |
| CN | 116457829 A | 7/2023 |
| CN | 116457833 A | 7/2023 |
| CN | 116508062 A | 7/2023 |
| CN | 116508063 A | 7/2023 |
| CN | 118414636 A | 7/2024 |
| CN | 118435243 A | 8/2024 |
| CN | 118613834 A | 9/2024 |
| DE | 102018207518 A1 | 11/2019 |
| EP | 2184092 A2 | 5/2010 |
| EP | 4453884 | 10/2025 |
| JP | 2001230801 A | 8/2001 |
| JP | 5497931 B2 | 3/2014 |
| KR | 101445263 B1 | 9/2014 |
| KR | 20150126938 A | 11/2015 |
| KR | 20170032146 A | 3/2017 |
| KR | 20180090746 A | 8/2018 |
| KR | 20200099578 | 8/2020 |
| KR | 102719270 B1 | 10/2024 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 | 7/2018 |
| WO | WO-2018129531 A1 | 7/2018 |
| WO | WO-2019089613 A1 | 5/2019 |
| WO | WO-2020047117 A1 | 3/2020 |
| WO | WO-2020132541 A1 | 6/2020 |
| WO | WO-2020163592 A1 | 8/2020 |
| WO | WO-2021197143 A1 | 10/2021 |
| WO | WO-2022093939 A1 | 5/2022 |
| WO | WO-2022093958 A1 | 5/2022 |

(56) References Cited

FOREIGN PATENT DOCUMENTS

| WO | WO-2022108805 A1 | 5/2022 |
| WO | WO-2022108806 A1 | 5/2022 |
| WO | WO-2022108807 A1 | 5/2022 |
| WO | WO-2023121896 A1 | 6/2023 |
| WO | WO-2023121897 A1 | 6/2023 |
| WO | WO-2023121898 A1 | 6/2023 |

OTHER PUBLICATIONS

"U.S. Appl. No. 16/269,312, Non Final Office Action mailed Apr. 14, 2020", 18 pgs.

"U.S. Appl. No. 16/269,312, Notice of Allowance mailed Aug. 19, 2020", 9 pgs.

"U.S. Appl. No. 16/269,312, Notice of Allowance mailed Dec. 30, 2020", 9 pgs.

"U.S. Appl. No. 16/269,312, Response filed Jun. 23, 2020 to Non Final Office Action mailed Apr. 14, 2020", 10 pgs.

"U.S. Appl. No. 16/951,884, Non Final Office Action mailed Sep. 9, 2021", 14 pgs.

"U.S. Appl. No. 17/081,178, Non Final Office Action mailed Mar. 9, 2022", 31 pgs.

"U.S. Appl. No. 17/081,178, Notice of Allowance mailed Aug. 17, 2022", 9 pgs.

"U.S. Appl. No. 17/081,178, Notice of Allowance mailed Dec. 5, 2022", 9 pgs.

"U.S. Appl. No. 17/081,178, Response filed Jun. 3, 2022 to Non Final Office Action mailed Mar. 9, 2022", 10 pgs.

"U.S. Appl. No. 17/081,178, Supplemental Notice of Allowability mailed Feb. 7, 2023", 2 pgs.

"U.S. Appl. No. 17/081,178, Supplemental Notice of Allowability mailed Aug. 31, 2022", 2 pgs.

"U.S. Appl. No. 17/212,555, Non Final Office Action mailed Oct. 4, 2021", 20 pgs.

"U.S. Appl. No. 17/557,277, Final Office Action Mailed Jun. 27, 2023", 20 pgs.

"U.S. Appl. No. 17/557,277, Non Final Office Action mailed Mar. 3, 2023", 28 pgs.

"U.S. Appl. No. 17/557,277, Notice of Allowance mailed Sep. 1, 2023", 11 pgs.

"U.S. Appl. No. 17/557,277, Response filed Jun. 5, 2023 to Non Final Office Action mailed Mar. 3, 2023", 11 pgs.

"U.S. Appl. No. 17/557,277, Response filed Aug. 11, 2023 to Final Office Action Mailed Jun. 27, 2023", 11 pgs.

"Bitmoji", Snapchat Support, [Online] Retrieved from the Internet: <URL: https://web.archive.org/web/20190503063620/https://support.snapchat.com/en-us/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"International Application Serial No. PCT/US2020/017006, International Search Report mailed Jul. 30, 2020", 6 pgs.

"International Application Serial No. PCT/US2020/017006, Invitation to Pay Additional Fees mailed Jun. 2, 2020", 13 pgs.

"International Application Serial No. PCT/US2020/017006, Written Opinion mailed Jul. 30, 2020", 12 pgs.

"International Application Serial No. PCT/US2021/056820, International Preliminary Report on Patentability mailed May 11, 2023", 11 pgs.

"International Application Serial No. PCT/US2021/056820, International Search Report mailed Feb. 28, 2022", 4 pgs.

"International Application Serial No. PCT/US2021/056820, Written Opinion mailed Feb. 28, 2022", 9 pgs.

"International Application Serial No. PCT/US2022/052520, International Search Report mailed Apr. 13, 2023", 4 pgs.

"International Application Serial No. PCT/US2022/052520, Written Opinion mailed Apr. 13, 2023", 5 pgs.

"International Application Serial No. PCT/US2022/052528, International Search Report mailed Mar. 28, 2023", 6 pgs.

"International Application Serial No. PCT/US2022/052528, Written Opinion mailed Mar. 28, 2023", 13 pgs.

"International Application Serial No. PCT/US2022/052532, International Search Report mailed Apr. 17, 2023", 4 pgs.

"International Application Serial No. PCT/US2022/052532, Written Opinion mailed Apr. 17, 2023", 4 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Skeletal animation", Wikipedia, [Online] Retrieved from the Internet: <URL: https://en.wikipedia.org/w/index.php?title=Skeletal_animation&oldid=694599494>, (Dec. 10, 2015), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Albahar, Badour, et al., "Pose with Style: Detail-Preserving Pose-Guided Image Synthesis with Conditional StyleGAN", arxiv.org, Cornell University Library, 201 Olin Library Cornell University Ithaca, NY 14853, (Sep. 13, 2021), 11 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.

Fieraru, Mihai, et al., "Learning to Refine Human Pose Estimation", IEEE/CVF Conference on Computer Vision and Pattern Recognition Workshops (CVPRW), (2018), 318-327.

Giaccone, P R, et al., "Foreground-background segmentation by cellular neural networks", IEEE 15th International Conference on Pattern Recognition (ICPR-2000), vol. 2, (2000), 438-441.

Guler, Riza Alp, et al., "DensePose: Dense Human Pose Estimation in the Wild", IEEE/CVF Conference on Computer Vision and Pattern Recognition, IEEE, (Jun. 18, 2018), 10 pgs.

Hauswiesner, et al., "Image-Based Clothes Transfer", 10th IEEE International Symposium on Mixed and Augmented Reality, (Oct. 2011), 169-172.

Jong, et al., "Short Video Datasets Show Potential for Outfits in Augmented Reality", 2019 International Conference on High Performance Computing and Simulation, (Jul. 2019), 201-208.

Kawai, Norihiko, et al., "Diminished Reality Based on Image Inpainting Considering Background Geometry", IEEE transactions on visualization and computer graphics, 22(3), (Mar. 1, 16), 1236-1247.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Lipeng, Ke, et al., "Multi-Scale Structure-Aware Network for Human Pose Estimation", Springer Nature Switzerland AG, ECCV 2018, LNCS 11206, (2018), 731-746.

(56)     References Cited

OTHER PUBLICATIONS

Liu, Ting, et al., "3D Clothing Transfer in Virtual Fitting Based on UV Mapping", 11th International Congress on Image and Signal Processing, Biomedical Engineering and Informatics (CISP-BMEI), IEEE, (Oct. 13, 2018), 6 pgs.

Liu, Ting, et al., "Spatial-Aware Texture Transformer for High-Fidelity Garment Transfer", IEEE Transactions on Image Processing, IEEE, USA, vol. 30, (Aug. 30, 2021).

Liu, Wen, et al., "Liquid Warping GAN With Attention: A Unified Framework for Human Image Synthesis", IEEE Transactions on Pattern Analysis and Machine Intelligence, IEEE Computer Society, USA, vol. 44, No. 9, (May 7, 2021), 18 pgs.

Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.

Marto, Anabela G R, et al., "DinofelisAR Demo: Augmented Reality Based on Natural Features", 12th Iberian Conference on Information Systems and Technologies (CISTI), Lisbon, Portugal, (Jun. 2017), 6 pgs.

Mehta, Dushyant, et al., "VNect: Real-time 3D Human Pose Estimation with a Single RGB Camera", arxiv.org, Cornell University Library, [Online] Retrieved from the internet: <https://vcai .mpi-inf.mpg.de/projects/VNect/>, (May 3, 2017), 14 pgs.

Nakajima, Yoshikatsu, et al., "Semantic Object Selection and Detection for Diminished Reality Based on SLAM with Viewpoint Class", IEEE International Symposium on Mixed and Augmented Reality Adjunct Proceedings, (2017), 338-343.

Newton, Casey, "Your Snapchat friendships now have their own profiles- and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Park, Jong-Seung, et al., "Virtual Object Placement in Video for Augmented Reality", Advances in Multimedia Information Processing-PCM 2005: 6th Pacific Rim Conference on Multimedia, Jeju Island, KR, Proceedings (vol. 3767). Springer, Berlin, DE, (2005), 13-24.

Raj, Amit, et al., "SwapNet: Image Based Garment Transfer", Pattern Recognition: 5th Asian Conference, ACPR 2019, Auckland, NZ, Nov. 26-29, 2019, Revised Selected Papers, Part II; [Lecture Notes in Computer Science], Springer, Cham, (Oct. 6, 2018), 679-695.

Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Robinson, Ian, "Add 3D text to video footage", Adobe.com/Youtube video, [Online] Retrieved from the Internet: <URL: https://helpx.adobe.com/after-effects/how-to/add-3d-text-video-footage.html>, (Mar. 10, 2017), 360 pgs.; 15:22 min.

Salas-Morena, Renato F, et al., "Dense Planar SLAM", IEEE Intl. Symposium on Mixed and Augmented Reality (ISMAR), Munich, Germany, [Online] Retrieved from the Internet: <URL: http://www.doc.ic.ac.uk/˜bglocker/pdfs/salas-moreno2014ismar.pdf>, (Jan. 1, 2014), 8 pgs.

Sarkar, Kripasindhu, et al., "Neural Re-rendering of Humans from a Single Image", 16th European Conference—Computer Vision—ECCV 2020, (Aug. 23, 2020), 18 pgs.

Schettini, R, et al., "A segmentation algorithm for color images", Pattern Recognition Letters, Elsevier, Amsterdam, NL, vol. 14, No. 6, (Jun. 1, 1993), 499-506.

Shohei, Mori, et al., "A survey of diminished reality: Techniques for visually concealing, eliminating, and seeing through real objects", IPSJ Transactions on Computer Vision and Applications, vol. 9, No. 1, (Jun. 28, 2017), 14 pgs.

Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

Yang-Tian, Sun, et al., "Human Motion Transfer with 3D Constraints and Detail Enhancement", arxiv.org, Cornell University Library, 201 Olin Library Cornell University Ithaca, NY 14853, (May 8, 2021), 12 pgs.

Yu, Li, et al., "Inpainting-Based Virtual Try-on Network for Selective Garment Transfer", IEEE Access, vol. 7, (Sep. 13, 2019), 134125-134136.

"U.S. Appl. No. 16/949,607, Notice of Allowance mailed Jan. 31, 2023", 10 pgs.

"U.S. Appl. No. 16/951,884, Corrected Notice of Allowability mailed Jun. 22, 2022", 2 pgs.

"U.S. Appl. No. 16/951,884, Final Office Action mailed Jan. 7, 2022", 15 pgs.

"U.S. Appl. No. 16/951,884, Notice of Allowance mailed Mar. 9, 2022", 5 pgs.

"U.S. Appl. No. 16/951,884, Notice of Allowance mailed Jun. 8, 2022", 5 pgs.

"U.S. Appl. No. 16/951,884, Response filed Feb. 16, 2022 to Final Office Action mailed Jan. 7, 2022", 10 pgs.

"U.S. Appl. No. 16/951,884, Response filed Dec. 1, 2021 to Non Final Office Action mailed Sep. 9, 2021", 11 pgs.

"U.S. Appl. No. 16/951,921, Advisory Action mailed Mar. 14, 2023", 3 pgs.

"U.S. Appl. No. 16/951,921, Corrected Notice of Allowability mailed Apr. 20, 2023", 4 pgs.

"U.S. Appl. No. 16/951,921, Final Office Action mailed Feb. 3, 2023", 30 pgs.

"U.S. Appl. No. 16/951,921, Non Final Office Action mailed Oct. 7, 2022", 27 pgs.

"U.S. Appl. No. 16/951,921, Notice of Allowance mailed Apr. 18, 2023", 9 pgs.

"U.S. Appl. No. 16/951,921, Response filed Jan. 6, 2023 to Non Final Office Action mailed Oct. 7, 2022", 10 pgs.

"U.S. Appl. No. 16/951,921, Response filed Mar. 2, 2023 to Final Office Action mailed Feb. 3, 2023", 10 pgs.

"U.S. Appl. No. 16/951,939, Final Office Action mailed Feb. 16, 2023", 19 pgs.

"U.S. Appl. No. 16/951,939, Non Final Office Action mailed Aug. 18, 2022", 16 pgs.

"U.S. Appl. No. 16/951,939, Notice of Allowance mailed Apr. 5, 2023", 8 pgs.

"U.S. Appl. No. 16/951,939, Response filed Nov. 17, 2022 to Non Final Office Action mailed Aug. 18, 2022", 9 pgs.

"U.S. Appl. No. 16/951,939, Response filed Mar. 9, 2023 to Final Office Action mailed Feb. 16, 2023", 9 pgs.

"U.S. Appl. No. 17/212,555, Corrected Notice of Allowability mailed Sep. 22, 2022", 2 pgs.

"U.S. Appl. No. 17/212,555, Final Office Action mailed Mar. 2, 2022", 25 pgs.

"U.S. Appl. No. 17/212,555, Notice of Allowance mailed May 17, 2022", 8 pgs.

"U.S. Appl. No. 17/212,555, Notice of Allowance mailed Sep. 1, 2022", 8 pgs.

"U.S. Appl. No. 17/212,555, Response filed Jan. 3, 2022 to Non Final Office Action mailed Oct. 4, 2021", 10 pgs.

"U.S. Appl. No. 17/212,555, Response filed Apr. 29, 2022 to Final Office Action mailed Mar. 2, 2022", 9 pgs.

"U.S. Appl. No. 17/557,652, Examiner Interview Summary mailed Jul. 2, 2024", 2 pgs.

"U.S. Appl. No. 17/557,652, Non Final Office Action mailed Apr. 12, 2024", 43 pgs.

"U.S. Appl. No. 17/557,652, Notice of Allowance mailed Aug. 21, 2024", 11 pgs.

(56)           References Cited

OTHER PUBLICATIONS

"U.S. Appl. No. 17/557,652, Response filed Jul. 10, 2024 to Non Final Office Action mailed Apr. 12, 2024", 11 pgs.

"U.S. Appl. No. 17/645,366, Non Final Office Action mailed Mar. 7, 2024", 24 pgs.

"U.S. Appl. No. 17/645,366, Notice of Allowance mailed Sep. 5, 2024", 10 pgs.

"U.S. Appl. No. 17/645,366, Response filed May 28, 2024 to Non Final Office Action mailed Mar. 7, 2024", 10 pgs.

"U.S. Appl. No. 17/645,366, Supplemental Notice of Allowability mailed Sep. 16, 2024", 2 pgs.

"U.S. Appl. No. 18/100,080, Notice of Allowance mailed Nov. 6, 2024", 9 pgs.

"U.S. Appl. No. 18/100,080, Supplemental Notice of Allowability mailed Nov. 15, 2024", 2 pgs.

"International Application Serial No. PCT/US2020/017006, International Preliminary Report on Patentability mailed Aug. 19, 2021", 14 pgs.

"International Application Serial No. PCT/US2021/056850, International Preliminary Report on Patentability mailed May 11, 2023", 11 pgs.

"International Application Serial No. PCT/US2021/056850, International Search Report mailed Feb. 9, 2022", 5 pgs.

"International Application Serial No. PCT/US2021/056850, Written Opinion mailed Feb. 9, 2022", 9 pgs.

"International Application Serial No. PCT/US2021/058800, International Preliminary Report on Patentability mailed Jun. 1, 2023", 8 pgs.

"International Application Serial No. PCT/US2021/058800, International Search Report mailed Feb. 18, 2022", 4 pgs.

"International Application Serial No. PCT/US2021/058800, Written Opinion mailed Feb. 18, 2022", 6 pgs.

"International Application Serial No. PCT/US2021/058811, International Preliminary Report on Patentability mailed Jun. 1, 2023", 13 pgs.

"International Application Serial No. PCT/US2021/058811, International Search Report mailed Feb. 24, 2022", 5 pgs.

"International Application Serial No. PCT/US2021/058811, Written Opinion mailed Feb. 24, 2022", 11 pgs.

"International Application Serial No. PCT/US2021/058816, International Preliminary Report on Patentability mailed Jun. 1, 2023", 17 pgs.

"International Application Serial No. PCT/US2021/058816, International Search Report mailed Mar. 3, 2022", 5 pgs.

"International Application Serial No. PCT/US2021/058816, Written Opinion mailed Mar. 3, 2022", 15 pgs.

"International Application Serial No. PCT/US2022/052520, International Preliminary Report on Patentability mailed Jul. 4, 2024", 7 pgs.

"International Application Serial No. PCT/US2022/052528, International Preliminary Report on Patentability mailed Jul. 4, 2024", 15 pgs.

"International Application Serial No. PCT/US2022/052532, International Preliminary Report on Patentability mailed Jul. 4, 2024", 6 pgs.

"Korean Application Serial No. 10-2021-7028027, Notice of Preliminary Rejection mailed Dec. 15, 2022", W/English Translation, 15 pgs.

"Korean Application Serial No. 10-2023-7017644, Notice of Preliminary Rejection mailed Apr. 26, 2024", w/ English translation, 10 pgs.

"Korean Application Serial No. 10-2023-7017644, Response filed Jun. 12, 2024 to Notice of Preliminary Rejection mailed Apr. 26, 2024", w/ current English claims, 29 pgs.

Cimen, Gokcen, et al., "Animation Models for Interactive AR Characters", Doctoral dissertation, Retrieved from the Internet: <URL:https://www.research-collection.ethz.ch/bitstream/handle/20. 500.11850/372660/5/AnimationModelsforinteractiveARCharacters. pdf>, [retrieved on Feb. 15, 2022], (Jan. 1, 2019), 1-113.

Cimen, Gokcen, et al., "AR Poser: Automatically Augmenting Mobile Pictures with Digital Avatars Imitating Poses", 12th International Conference on Computer Graphics, Visualization, Computer Vision and Image Processing, (Jul. 18, 2018), 5 pgs.

Li, et al., "PoNA: Pose-guided Non-local Attention for Human Pose Transfer", (2020), 16 pgs.

Liu, Wen, et al., "Liquid Warping GAN: A Unified Framework for Human Motion Imitation, Appearance Transfer and Novel View Synthesis", IEEE/CVF International Conference on Computer Vision (ICCV), IEEE, (Oct. 27, 2019), 10 pgs.

Vogele, Anna, et al., "Interactive steering of mesh animations", Computer Animation, Eurographics Association, P. 0. Box 16 Aire-La-Ville CH-1288 Switzerland, (Jul. 29, 2012), 53-58.

Yamane, Katsu, et al., "Animating non-humanoid characters with human motion data", Computer Animation, Eurographics Association, P. 0. Box 16 Aire-La-Ville CH-1288 Switzerland, (Jul. 2, 2010), 169-178.

Yong, Du, et al., "Hierarchical Recurrent Neural Network for Skeleton Based Action Recognition", IEEE Conference on Computer Vision and Pattern Recognition (CVPR), (Jun. 2015), 1110-1118.

Zhu, et al., "Progressive and Aligned Pose Attention Transfer for Person Image Generation", IEEE Transactions on Pattern Analysis and Machine Intelligence, (2021), 21 pgs.

"European Application Serial No. 22847345.0 , Response to Communication Pursuant to Rules 161 and 162 EPC Filed Jan. 10, 2025", 16 pgs.

"U.S. Appl. No. 17/557,652, Corrected Notice of Allowance mailed Dec. 20, 2024", 5 pgs.

"U.S. Appl. No. 17/557,652, Notice of Allowance mailed Dec. 19, 2024", 5 pgs.

"European Application Serial No. 25196552.1, Extended European Search Report mailed Nov. 18, 2025", 7 pgs.

Wu, Zhonghua, et al., "M2E-Try on Net: Fashion from Model to Everyone", Proceedings of the 28th ACM Joint Meeting on European Software Engineering Conference and Symposium on the Foundations of Software Engineering, ACM, New York, NY, USA, pp. 293-301, (Oct. 15, 2019), 9 pgs.

Yu, Ruiyun, et al., "VTNFP: An Image-based Virtual Try-on Network with Body and Clothing Feature Preservation", 2019 IEEE/CVF International Conference on Computer Vision (ICCV), IEEE, pp. 10510-10519, (Oct. 27, 2019), 10 pgs.

Zanfir, Mihai, et al., "Human Appearance Transfer", 2018 IEEE/CVF Conference on Computer Vision and Pattern Recognition, IEEE, pp. 5391-5399, (Jun. 18, 2018), 9 pgs.

Zheng, Haitian, et al., "Pose Flow Learning From Person Images for Pose Guided Synthesis", IEEE Transactions on Image Processing, IEEE, USA, vol. 30, (Oct. 20, 2020), 1898-1909.

"Korean Application Serial No. 10-2024-7023976, Notice of Preliminary Rejection mailed Jan. 11, 2026", w/ English Translation, 21 pgs.

"Korean Application Serial No. 10-2024-7024068, Notice of Preliminary Rejection mailed Jan. 11, 2026", w/ English Translation, 18 pgs.

"Korean Application Serial No. 10-2024-7034255, Notice of Preliminary Rejection mailed Jan. 15, 2026", w/ English Translation, 14 pgs.

"Korean Application Serial No. 10-2024-7023978, Notice of Preliminary Rejection mailed Jan. 11, 2026", w/ English Translation, 22 pgs.

Yu, Ruiyun, "VTNFP an Image-based Virtual Tryon Network with Body and Clothing Feature Preservation", Proceedings of the IEEE CVF International Conference on Computer Vision, Oct. 27, 2019, 10 pgs , 2019.

400

402 — MSG_ID

404 — MSG_TEXT

406 — MSG_IMAGE

408 — MSG_VID

410 — MSG_AUD

412 — MSG_AUG

414 — MSG_DUR

416 — MSG_LOCATION

418 — MSG_STRY_ID

420 — MSG_TAG

422 — MSG_SENDER ID

424 — MSG_RECEIVER ID

312 IMAGE TABLE

304 VIDEO TABLE

310 AUGMENTATION TABLE

314 STORY TABLE

306 ENTITY TABLE

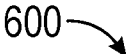
600
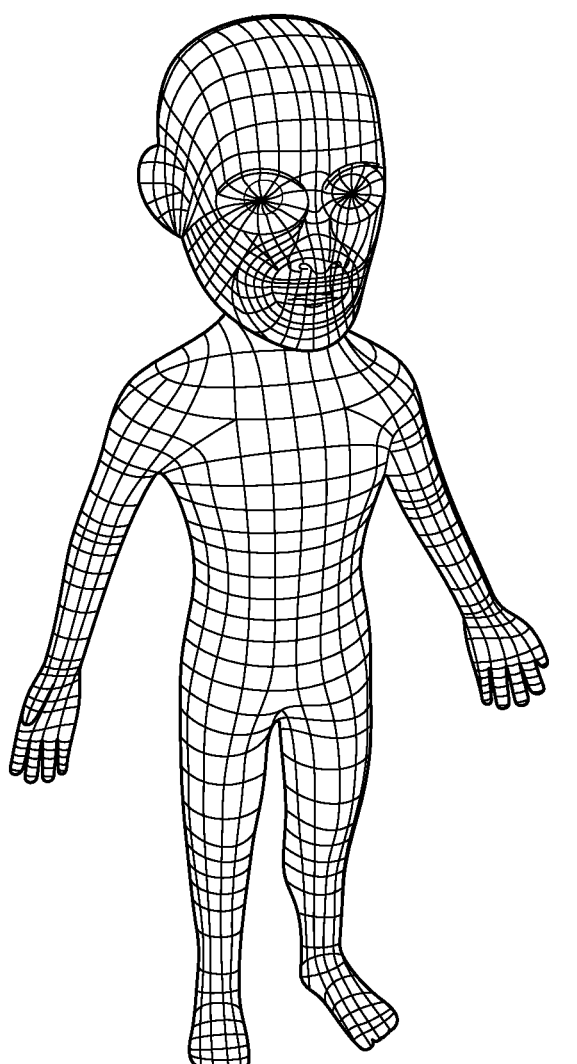
**FIRST ML OUTPUT –
MOTION AND
APPEARANCE**
1) THREE-DIMENSIONAL
(3D) POSE
2) FULL BODY/UPPER-
BODY SEGMENTATION
3) A SET OF DENSE
KEYPOINTS
4) A GARMENT
SEGMENTATION
*FIG. 6*

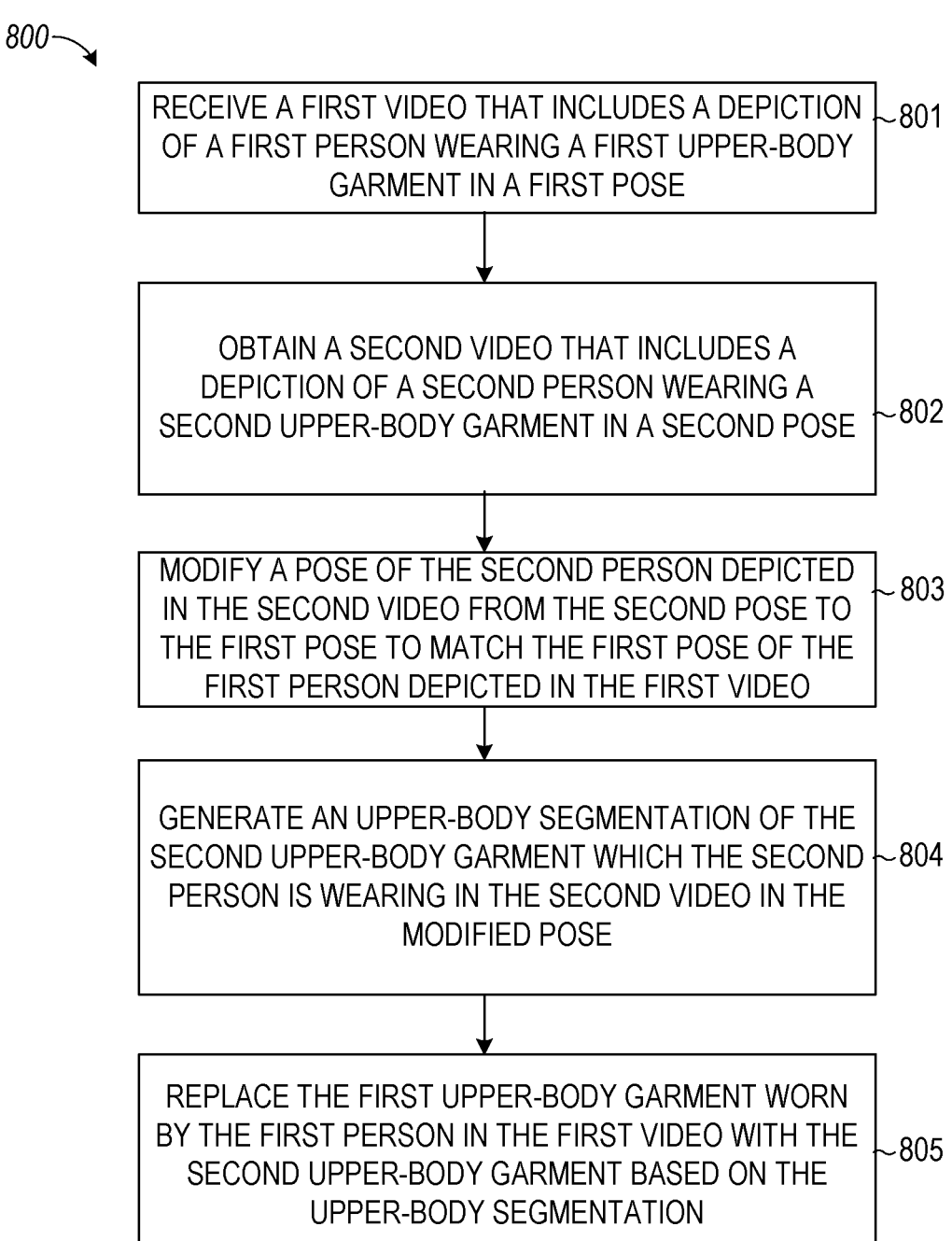

800

RECEIVE A FIRST VIDEO THAT INCLUDES A DEPICTION OF A FIRST PERSON WEARING A FIRST UPPER-BODY GARMENT IN A FIRST POSE ~801

OBTAIN A SECOND VIDEO THAT INCLUDES A DEPICTION OF A SECOND PERSON WEARING A SECOND UPPER-BODY GARMENT IN A SECOND POSE ~802

MODIFY A POSE OF THE SECOND PERSON DEPICTED IN THE SECOND VIDEO FROM THE SECOND POSE TO THE FIRST POSE TO MATCH THE FIRST POSE OF THE FIRST PERSON DEPICTED IN THE FIRST VIDEO ~803

GENERATE AN UPPER-BODY SEGMENTATION OF THE SECOND UPPER-BODY GARMENT WHICH THE SECOND PERSON IS WEARING IN THE SECOND VIDEO IN THE MODIFIED POSE ~804

REPLACE THE FIRST UPPER-BODY GARMENT WORN BY THE FIRST PERSON IN THE FIRST VIDEO WITH THE SECOND UPPER-BODY GARMENT BASED ON THE UPPER-BODY SEGMENTATION ~805

FIG. 8

REAL-TIME UPPER-BODY GARMENT EXCHANGE

CLAIM OF PRIORITY

This application is a continuation of U.S. patent application Ser. No. 17/557,277, filed on Dec. 21, 2021, which is incorporated herein by reference in its entirety.

TECHNICAL FIELD

The present disclosure relates generally to providing augmented reality (AR) experiences using a messaging application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIGS. 6 and 7 are diagrammatic representations of outputs of the motion and appearance transfer system, in accordance with some examples.

FIG. 8 is a flowchart illustrating example operations of the motion and appearance transfer system, according to some examples.

DETAILED DESCRIPTION

Figure 1:
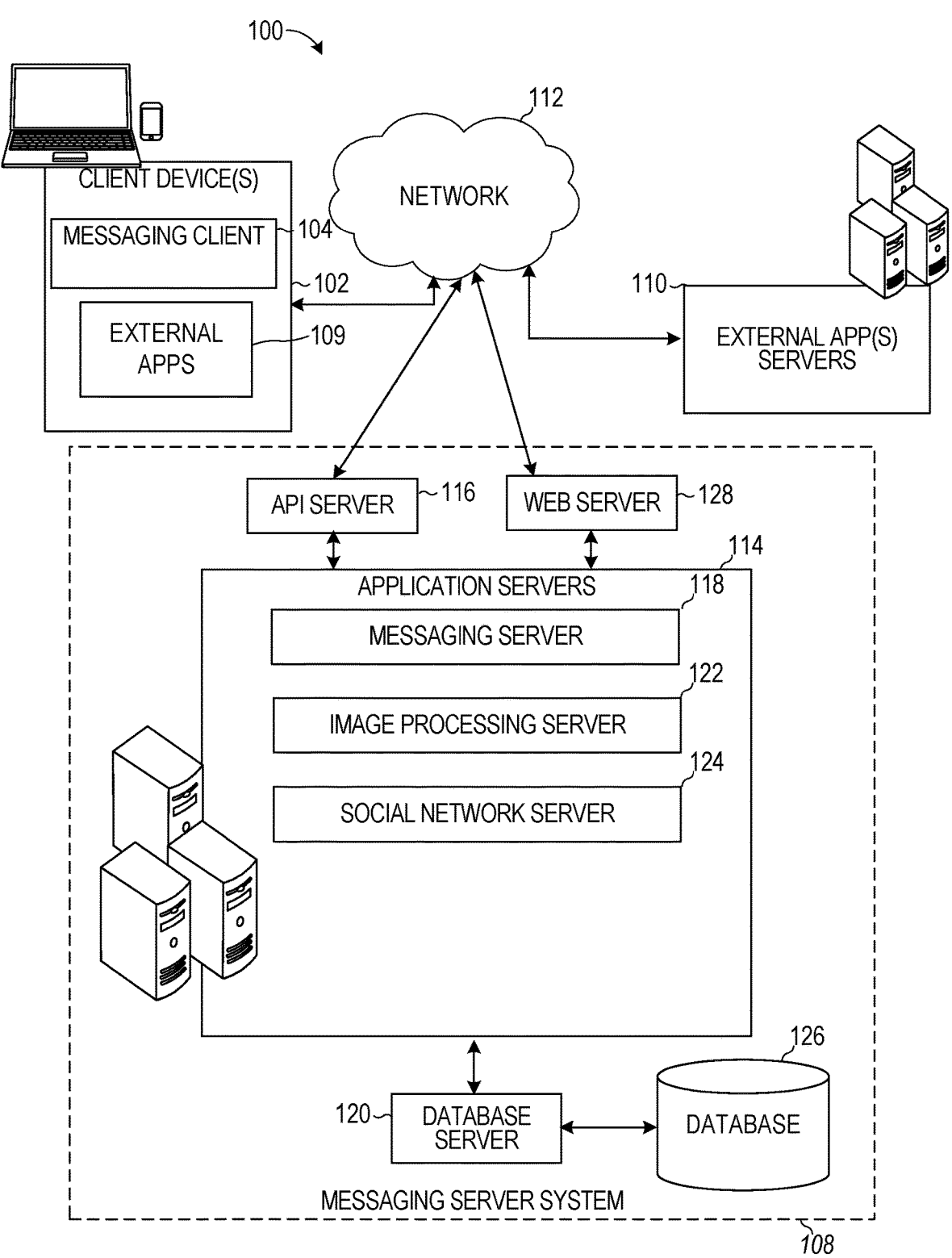
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems display images representing a given user by capturing an image of the user and, in addition, obtaining a depth map using a depth sensor of the real-world human body depicted in the image. By processing the depth map and the image together, the VR and AR systems can detect positioning of a user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive.

Certain systems do away with the need to use depth sensors to modify images. For example, certain systems allow users to replace a background in a videoconference in which a face of the user is detected. Specifically, such systems can use specialized techniques that are optimized for recognizing a face of a user to identify the background in the images that depict the user's face. These systems can then replace only those pixels that depict the background so that the real-world background is replaced with an alternate background in the images. However, such systems are generally incapable of recognizing a whole body of a user. As such, if the user is more than a threshold distance from the camera such that more than just the face of the user is captured by the camera, the replacement of the background with an alternate background begins to fail. In such cases, the image quality is severely impacted, and portions of the face and body of the user can be inadvertently removed by the system as the system falsely identifies such portions as belonging to the background rather than the foreground of the images. Also, such systems fail to properly replace the background when more than one user is depicted in the image or video feed. Because such systems are generally incapable of distinguishing a whole body of a user in an image from a background, these systems are also unable to apply visual effects to certain portions of a user's body, such as articles of clothing, garments, or fashion accessories and items (e.g., jewelry, handbags, purses, and so forth).

Some AR systems allow AR graphics to be added to an image or video to provide engaging AR experiences. Such systems can receive the AR graphics from a designer and can scale and position the AR graphics within the image or video. In order to improve the placement and positioning of the AR graphics on a person depicted in the image or video, such systems detect a person depicted in the image or video and generate a rig representing bones of the person. This rig is then used to adjust the AR graphics based on changes in movement to the rig. While such approaches generally work well, the need for generating a rig of a person in real time to adjust AR graphics placement increases processing complexities and power and memory requirements. This makes such systems inefficient or incapable of running on small-scale mobile devices without sacrificing computing resources or processing speed. Also, the rig only represents movement of skeletal or bone structures of a person in the image or video and does not take into account any sort of external physical properties of the person, such as density, weight, skin attributes, and so forth. As such, any AR graphics in these systems can be adjusted in scale and positioning but cannot be deformed based on other physical properties of the person. In addition, an AR graphics designer typically needs to create a compatible rig for their AR graphic or AR fashion item.

The disclosed techniques improve the efficiency of using the electronic device by using a combination of machine learning techniques (e.g., neural networks) to extract appearance and motion features simultaneously of a person depicted in one image and to render a new image that depicts the person with the same motion but different appearance features corresponding to a person depicted in a different image. By using a machine learning technique to extract the appearance and motion features simultaneously, the disclosed techniques can apply one or more visual effects to the image or video in association with the person depicted in the image or video in real time in a more efficient manner and without the need for generating a rig or bone structures of the depicted object.

In one example, a first client device of a first person can be used to capture first and second images or videos of the first person and a second person, respectively. The motion features of the first person can be extracted from the captured first image or video and used to adjust motion of the second person. Namely, a machine learning technique can be applied to combine the appearance features of the second person with the motion features of the first person to render a new image or video that depicts the second person performing motion corresponding to the motion of the first person without changing the appearance of the first person. After motion of the second person is adjusted, an upper-body garment segmentation is applied to one or more upper-body garments worn by the second person. The upper-body garment segmentation of the one or more upper-body garments worn by the second person is then used to replace an upper-body garment worn by the first person depicted in the first image or video.

In some examples, lighting conditions of the first image or video that depicts the first person are used to adjust one or more colors of the one or more upper-body garments worn by the second person. This way, when the one or more upper-body garments of the second person are applied and used to replace the upper-body garment worn by the first person in the first video, the lighting conditions of the first video are preserved. This maintains the illusion that the upper-body garments of the second person are part of the real-world environment of the first person.

This simplifies the process of adding AR graphics to an image or video which significantly reduces design constraints and costs in generating such AR graphics and decreases the amount of processing complexities and power and memory requirements. This also improves the illusion of the AR graphics being part of a real-world environment depicted in an image or video that depicts the object. This enables seamless and efficient addition of AR graphics to an underlying image or video in real time on small-scale mobile devices. The disclosed techniques can be applied exclusively or mostly on a mobile device without the need for the mobile device to send images/videos to a server. In other examples, the disclosed techniques are applied exclusively or mostly on a remote server or can be divided between a mobile device and a server.

As a result, a realistic display can be provided that shows the user wearing an AR fashion item while changing a real-world pose or motion of the user based on a pose or motion of a different user. This improves the overall experience of the user in using the electronic device. Also, by providing such AR experiences without using a depth sensor, the overall amount of system resources needed to accomplish a task is reduced. As used herein, "article of clothing," "fashion item," and "garment" are used interchangeably and should be understood to have the same meaning.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
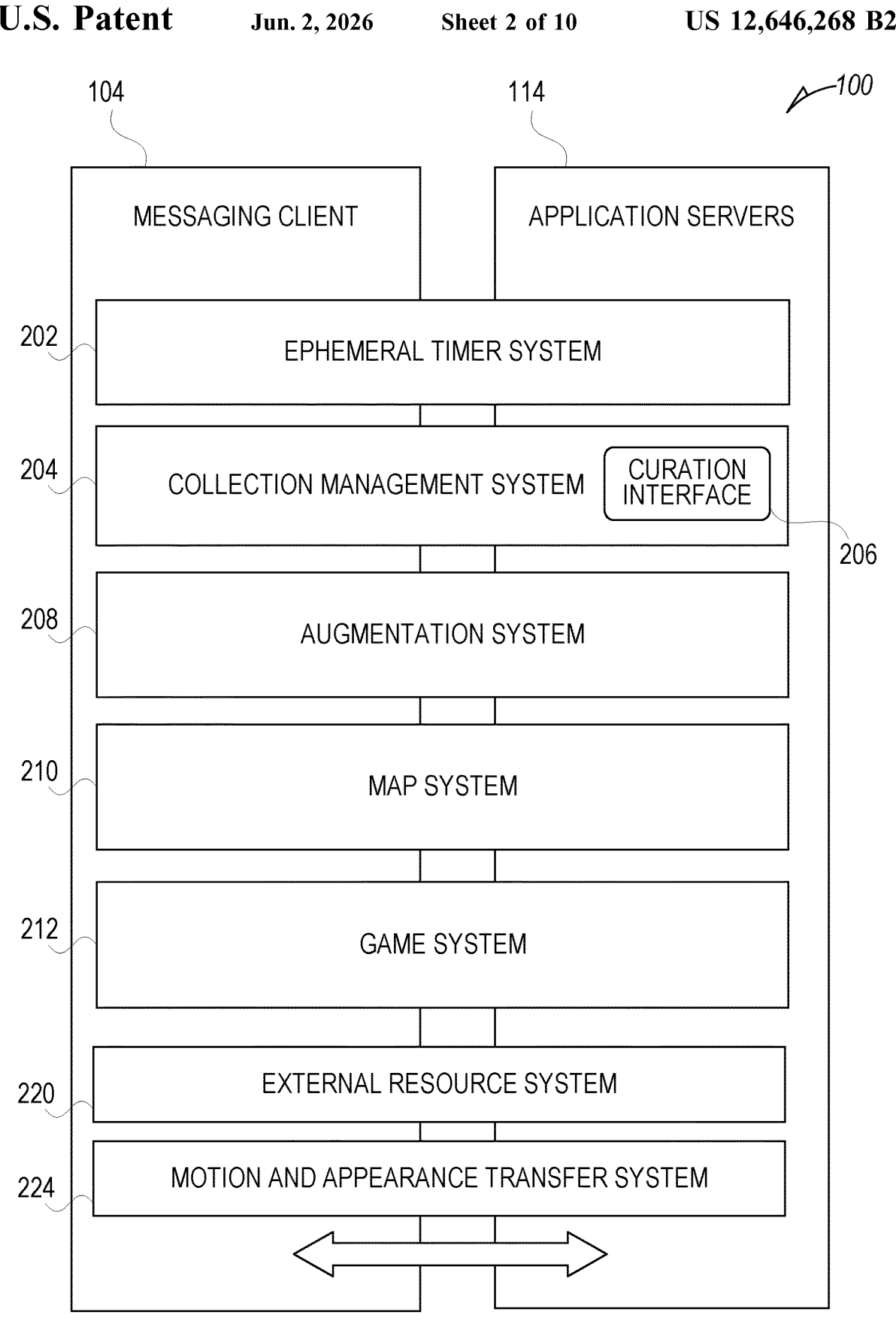
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., replacing a garment being worn by a user in a video or recoloring the garment worn by the user in the video or modifying the garment based on a gesture performed by the user).

Figure 3:
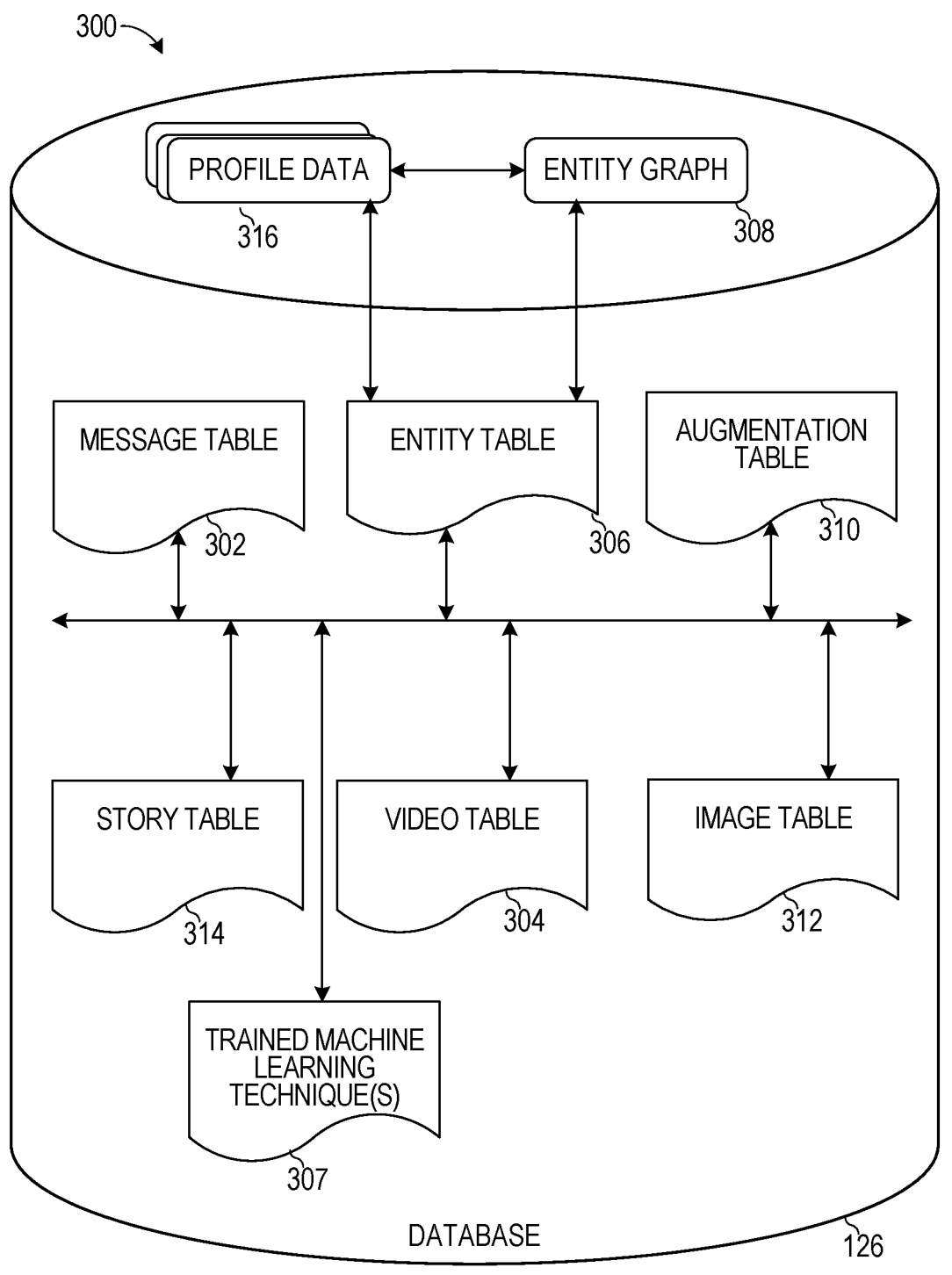
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following" and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends)

external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

In an example, the messaging client 104 enables a user to launch an AR experience in which a first person (e.g., the user of the messaging client 104) is depicted as wearing one or more upper-body garments worn by a second person depicted in another image. Particularly, the messaging client 104 implemented on a first client device of a first person can be used to capture an image or video of a second person. The messaging client 104 implemented on the first client device of the first person can be used to also capture an image or video of the first person. The motion features of the first person can be extracted from the captured image or video. The messaging client 104 on the first client device can extract appearance features of the second person from the image or video. The messaging client 104 can apply a machine learning technique to combine the appearance features of the second person with the motion features of the first person to render a new image or video that depicts the second person performing motion corresponding to the motion of the first person without changing the appearance of the second person.

In an example, this results in modifying the pose of the second person to match the pose of the first person without changing the appearance of the second person (e.g., upper-body clothing worn by the second person). A segmentation of the second person's upper-body garments can be performed after modifying the pose or motion of the second person. The segmentation is used to obtain pixel values and positions of the upper-body garments worn by the second person performing the pose of the first person. These pixels values and positions are copied using a mask and used to modify corresponding pixel values and positions of the first person.

In some examples, lighting conditions of the image or video that depicts the first person can be obtained. The upper-body garments worn by the second person can be extracted based on the upper-body segmentation of the second person. Namely, after the pose or motion of the second person is changed, the upper-body garments worn by the second person in the changed pose or motion are extracted. The lighting conditions can be used to change one or more colors of the extracted upper-body garments. The upper-body garments with the changed one or more colors can then be used to modify the upper-body garment worn by the first person depicted in the image or video. For example, a sweater worn by the second person can be rendered as being worn by the first person without changing another article of clothing worn by the first person (e.g., jeans or shorts).

This results in the appearance of the first person changing from wearing one upper-body garment or article of clothing to wearing another upper-body garment or article of clothing that is being worn by the second person. In some implementations, similar techniques can be applied to replace the upper-body garment worn by the second person with the upper-body garment worn by the first person. In this way, the first person can view how the first person looks wearing a real-world upper-body article of clothing or fashion item of a second person in real time. Article of clothing, garment, or fashion item can include a shirt, pants, skirt, dress, jewelry, purse, furniture item, household item, eyewear, eyeglasses, AR logos, AR emblems, purse, pants, shorts, skirts, jackets, t-shirts, blouses, glasses, jewelry, earrings, bunny ears, a hat, ear muffs, or any other suitable item or object. Further details of this AR experience are discussed below in connection with the motion and appearance transfer system 224 of FIG. 5.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or an image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions), and other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

A motion and appearance transfer system 224 enables a user to launch an AR experience in which the user (e.g., a first person) is depicted as wearing an upper-body garment worn by a second person depicted in another image. An illustrative implementation of the motion and appearance transfer system 224 is shown and described in connection with FIG. 5 below.

Specifically, the motion and appearance transfer system 224 is a component that can be accessed by an AR/VR application implemented on the client device 102. The AR/VR application uses an RGB camera to capture a monocular image of a user. The AR/VR application applies various trained machine learning techniques on the captured image of the user to generate appearance and motion features representing the user depicted in the image or video and to apply one or more AR visual effects to the captured image or video based on motion and/or appearance features (e.g., 3D pose, 3D body mesh, full body, upper-body or whole-body segmentation, set of dense keypoints, texture, color, and/or garment segmentation) of a different user depicted in another image or video. In some implementations, the AR/VR application continuously captures images of the user and updates the motion and/or appearance features in real time or periodically to continuously or periodically update the applied one or more visual effects. This allows the user to move around in the real world and see the one or more visual effects (e.g., the motion of another user applied to the appearance of the user) update in real time.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interest-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content.

Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of real-world objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items or elements thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using body/person detection, the body/person is detected on an image with use of a specific body/person detection algorithm (e.g., 3D human pose estimation and mesh reconstruction processes). Then, an ASM algorithm is applied to the body/person region of an image to detect body/person feature reference points.

Other methods and algorithms suitable for body/person detection can be used. For example, in some examples, features are located using a landmark, which represents a distinguishable point present in most of the images under consideration. For body/person landmarks, for example, the location of the left arm may be used. If an initial landmark is not identifiable, secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the body/person determined by a global body/person detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, 3D human pose estimation, 3D body mesh reconstruction, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a body/person within the image or video stream and provides modification icons associated with a computer animation model to transform image data, or the computer animation model can be present as associated with an interface described herein. The modification icons include changes that may be the basis for modifying the user's body/person within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the body/person being modified by the transformation system and store it for later viewing or browse to other areas of the imaging application. Where multiple faces are modified by the transformation system, the user may toggle the modification on or off globally by tapping or selecting a single body/person modified and displayed within a graphical user interface. In some examples, individual bodies/persons, among a group of multiple bodies/persons, may be individually modified, or such modifications may be individually toggled by tapping or selecting the individual body/person or a series of individual bodies/persons displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters that have been trained during training of the motion and appearance transfer system 224. For example, trained machine learning techniques 307 stores the trained parameters of one or more neural network machine learning techniques.

Data Communications Architecture

Figure 4:
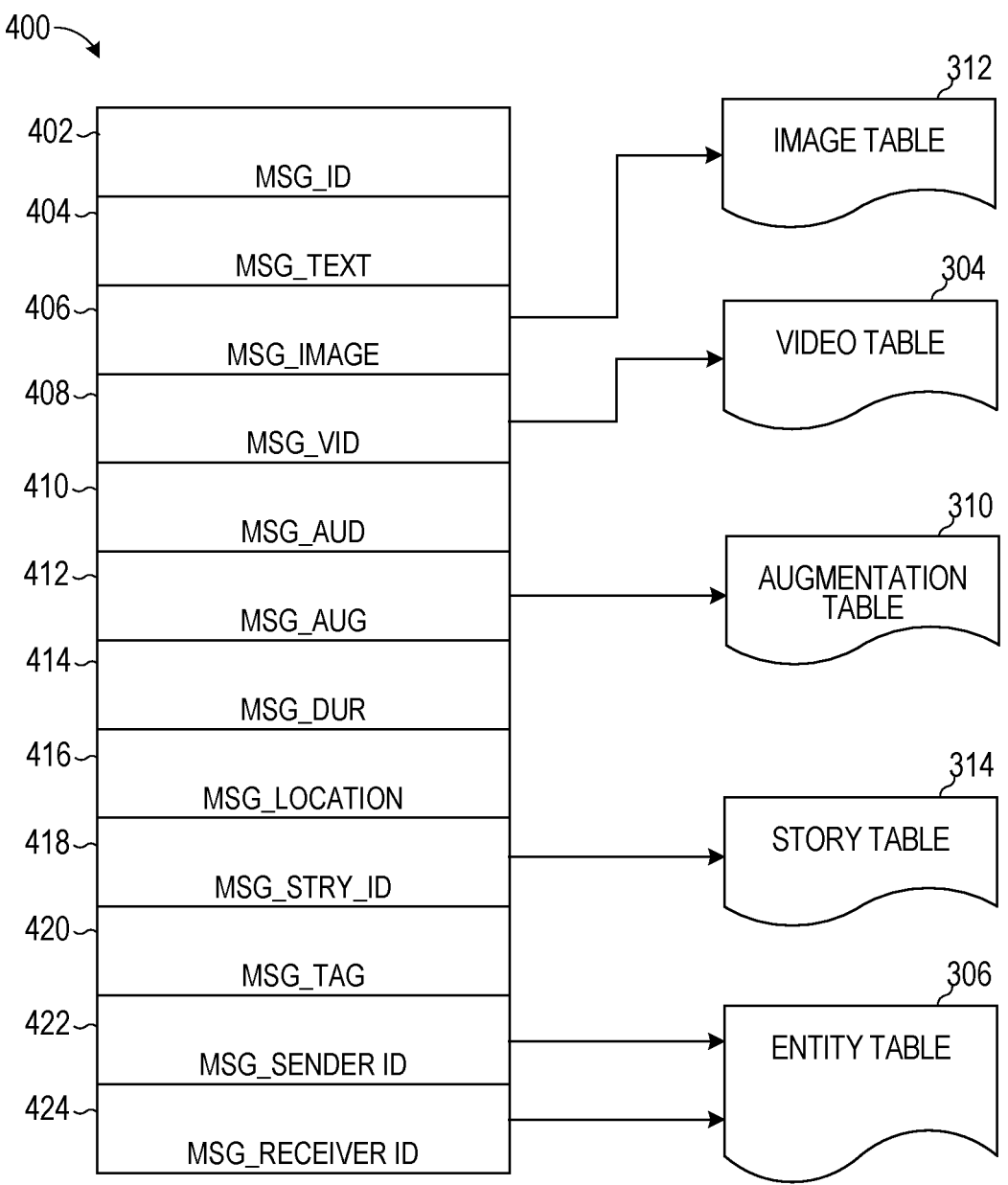
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Motion and Appearance Transfer System

Figure 5:
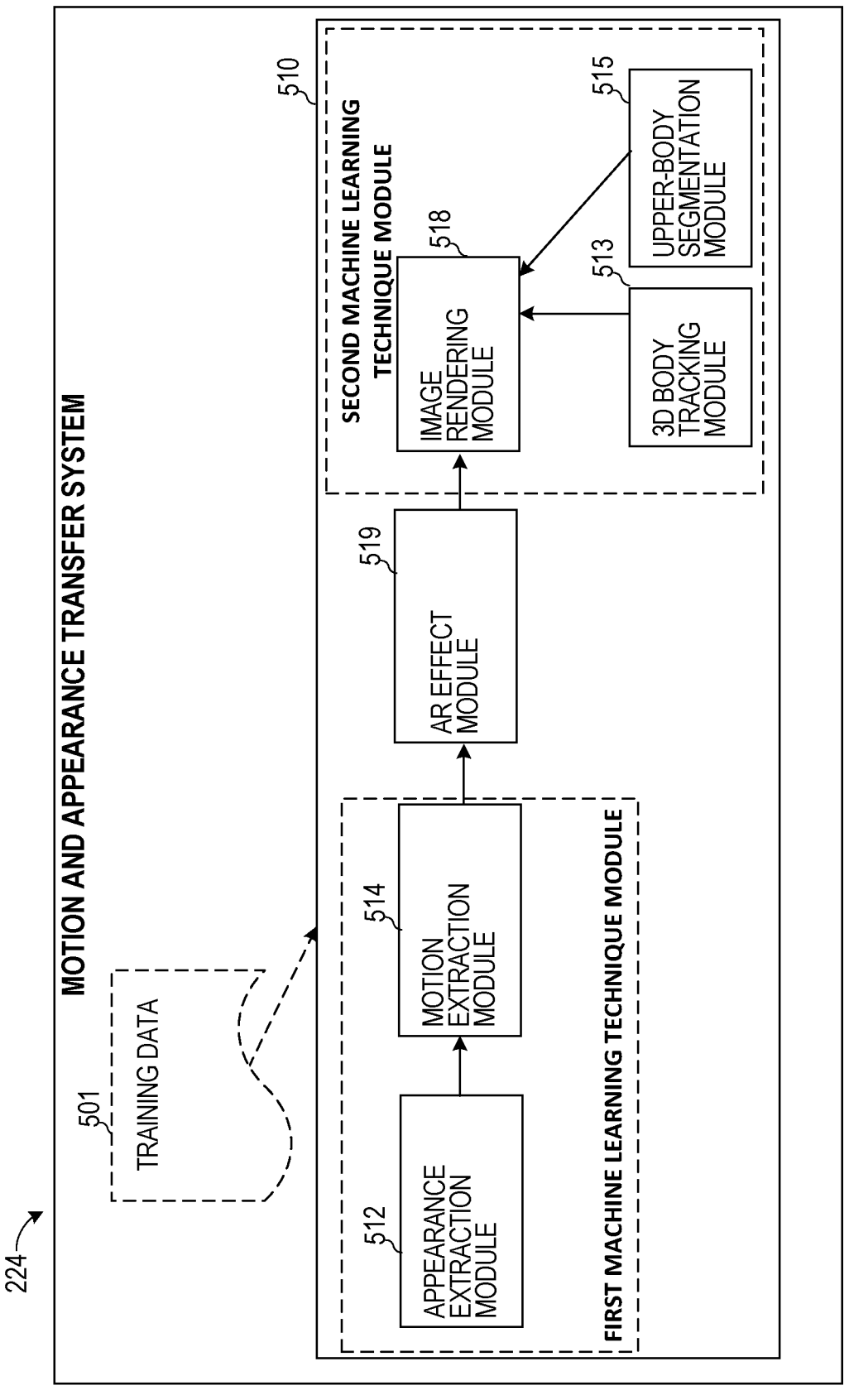
FIG. 5 is a block diagram showing an example motion and appearance transfer system, according to some examples.

FIG. 5 is a block diagram showing an example motion and appearance transfer system 224, according to some examples. Motion and appearance transfer system 224 includes a set of components 510 that operate on a set of input data (e.g., one or more monocular images or videos depicting a real-world object, such as a person or training data). The set of input data is obtained from one or more database(s) (FIG. 3) during the training phases and is obtained from an RGB camera of a client device 102 when an AR/VR application is being used, such as by a messaging client 104. Motion and appearance transfer system 224 includes multiple machine learning techniques (e.g., a first machine learning technique module and a second machine learning technique module). Particularly, the motion and appearance transfer system 224 includes an appearance extraction module 512, a motion extraction module 514, an AR effect module 519, an image rendering module 518, a 3D body tracking module 513 and an upper-body segmentation module 515.

The motion and appearance transfer system 224 enables an AR experience in which a first person can be depicted as wearing an upper-body garment worn by a second person. For example, the motion and appearance transfer system 224 enables the first person to capture a first video or image of the first person, such as using a front-facing camera of a client device 102 of the first person. The first video or image may depict the first person performing a first pose or motion and wearing a first upper-body garment (e.g., a t-shirt, sweater, jewelry, and so forth). The motion and appearance transfer system 224 captures the first image or video of the first person, such as by activating a front-facing or rear-facing image capture device (camera) of the client device 102 of the first person.

The motion and appearance transfer system 224 enables the first person to capture or receive a second video or image of a second person, such as using a rear-facing camera or via a message received in a communication session (e.g., a chat interface). The second video or image may depict the second person performing a second pose or motion and wearing a second upper-body garment that is different from the first pose or motion and first upper-body garment worn by the first person depicted in the first image or video. In some examples, the motion and appearance transfer system 224 can receive the second video or image of the second person from a client device 102 of the second person in real time instead of capturing the second image or video using the client device 102 of the first person. For example, the motion and appearance transfer system 224 can enable a first person to capture the second image or video of the second user by pointing an image capture device (e.g., rear-facing or front-facing camera) of the client device 102 of the first person towards a direction of the second person. In another example, the motion and appearance transfer system 224 can enable the second person to capture the second image or video of the second person using the client device 102 of the second person and to send the captured second image or video from the client device 102 of the second person to the client device 102 of the first person via a communication session.

The motion and appearance transfer system 224 applies an appearance extraction module 512 to extract appearance features of the second person from the second image or video that depicts the second person. In some cases, the appearance extraction module 512 extracts the appearance features and motion features of the second person from the second image or video that depicts the second person simultaneously but only retains the appearance features. The motion and appearance transfer system 224 also extracts the motion features of the first person from the first image or video that depicts the first person by applying the motion extraction module 514 to the first image or video. The motion extraction module 514 can extract the appearance features and motion features of the first person from the first image or video that depicts the first person simultaneously but only retains the motion features. The motion and appearance features can be extracted by applying the first and second images or videos to a feature extraction network (e.g., a first neural network or first machine learning technique). The first and second images or videos can be applied to the first neural network in parallel or sequentially to extract the appearance and/or motion features from the first and second images or videos. Namely, the appearance extraction module 512 and the motion extraction module 514 can be implemented by the first neural network or machine learning technique.

The motion and appearance transfer system 224 can then render a new image or video that depicts the second person in the pose of the first person but wearing the second upper-body garment. In one example, the motion and appearance transfer system 224 applies to an image generation system (e.g., a second neural network implemented by the image rendering module 518) the appearance features of the second person extracted from the second image or video together with the motion features of the first person extracted from the first image or video. The image rendering module 518 can render a third image or video that depicts the second person in the pose or motion of the first person based on the appearance and motion features received from the first machine learning technique module. The image rendering module 518 can then apply a further neural network implemented by an upper-body segmentation module 515 to generate an upper-body segmentation of the upper-body garment worn by the second person that is now in the pose of the first person. Namely, the upper-body segmentation module 515 can be applied to the third image or video that depicts the second person in the pose or motion of the first person.

After generating the upper-body segmentation, an upper-body mask can be applied to the third image or video to obtain pixel values and positions of the upper-body garment worn by the second person. The image rendering module 518 can then render a fourth new image or video using the appearance and motion features of the first video that depicts the first person wearing the upper-body garment worn by the second person and using the obtained pixel values and positions of the upper-body garment worn by the second person. Specifically, the image rendering module 518 can replace the pixel values and positions of the first video with the pixel values and positions obtained using the mask applied to the third video. This results in a fourth image or video that depicts the first person wearing the second upper-body garment worn by the second person depicted in the second video instead of wearing the first upper-body garment. In some examples, the image rendering module 518 can implement a single neural network that is trained to render a new image or video that replaces an upper-body garment worn by a person in a first video with a different upper-body garment worn by another person in a second video. In this case, the image rendering module 518 can render only one new image or video based on receiving the motion and appearance features extracted from a first video depicting a first person wearing a first upper-body garment and a second video depicting a second person wearing a second upper-body garment.

In some examples, the upper-body mask can be applied to the third image or video to extract pixel values and positions of the upper-body garment worn by the second person. The image rendering module 518 can obtain appearance features of the first video to determine lighting conditions of the first video. The lighting conditions can be determined for a region of the first video that depicts the upper-body garment worn by the first person. The image rendering module 518 can modify one or more colors of the extracted pixel values and positions of the upper-body garment worn by the second person based on the lighting conditions. For example, the image rendering module 518 can determine that a right sleeve portion depicted in the first video has lighting conditions that are brighter than a left sleeve portion depicted in the first video. In response, the image rendering module 518 can increase a brightness, luminance, and/or intensity value of the extracted pixel values of the upper-body garment worn by the second person corresponding to the right sleeve. Similarly, the image rendering module 518 can decrease a brightness, luminance, and/or intensity value of the extracted pixel values of the upper-body garment worn by the second person corresponding to the left sleeve. This preserves the lighting conditions of the first video by modifying the lighting conditions of the garment depicted in the second video to match the lighting conditions of the first video.

The image rendering module 518 can then render a fourth new image or video using the appearance and motion features of the first video that depicts the first person wearing the upper-body garment worn by the second person and using the obtained pixel values and positions of the upper-body garment worn by the second person which have been adjusted based on the lighting conditions of the first video. Specifically, the image rendering module 518 can replace the pixel values and positions of the first video with the pixel values and positions obtained using the mask applied to the third video and which have been adjusted in color to match the lighting conditions of the first video. This results in a fourth image or video that depicts the first person wearing the second upper-body garment worn by the second person depicted in the second video instead of wearing the first upper-body garment.

During training, the motion and appearance transfer system 224 receives a set of training images or videos from training data 501. The motion and appearance transfer system 224 applies one or more machine learning techniques using the first and second machine learning technique modules on the given set of training images or videos. The first and second machine learning technique modules extract one or more features from the given set of training images or videos to render an estimated image or video that depicts a person having a certain appearance that matches an appearance of another person (e.g., the person's upper-body garments in the estimated image or video can be modified to match the upper-body garments worn by another person). The first and second machine learning technique modules can be trained end-to-end until a stopping criterion is met.

In an example, to train the first and second machine learning techniques of the motion and appearance transfer system 224, the motion and appearance transfer system 224 obtains a first pair of training images or videos. The first pair of training images or videos include a first training image or video that depicts a given person wearing a particular upper-body article of clothing and performing a first motion or pose. The first pair of training images or videos include a second training image or video that depicts the same given person wearing a different upper-body article of clothing and performing a second motion or pose. In some cases, the second training image or video depicts the same given person wearing the same upper-body article of clothing and performing a second motion or pose.

The first training image or video is applied to the first machine learning technique (e.g., the motion extraction module 514) to extract one or more motion features from the first training image or video. In an example, the first machine learning technique extracts the appearance and motion features simultaneously but the motion extraction module 514 only retains the motion features of the first training image or video. The motion or pose features can include a 2D or 3D whole or upper-body segmentation, an upper-body mesh, 3D pose information and/or a set of dense keypoints.

The second training image or video is applied to the first machine learning technique (e.g., the appearance extraction module 512) to extract one or more appearance features from the second training image or video. In an example, the first machine learning technique extracts the appearance and motion features simultaneously but the appearance extraction module 512 only retains the appearance features of the second training image or video. The appearance features can include a 2D or 3D texture and pixel color information and upper-body segmentation and upper-body article of clothing (garment) segmentation and/or a set of dense keypoints.

The appearance features extracted from the second training image or video and the motion features extracted from the first training image or video are applied to the image rendering module 518 (e.g., a second machine learning technique). The image rendering module 518 generates or estimates a new image or video in which the given person depicted in the first training image or video is depicted as wearing the particular upper-body article of clothing as the given person depicted in the second training image or video. Namely, the second machine learning technique is trained to generate an image or video that retains the motion of a person in a first image but that has an appearance in which an upper-body garment is replaced to copy an upper-body garment worn by another person in a second image or video. The image rendering module 518 can adjust colors (pixel values, luminance, intensity, and so forth) of the upper-body garment worn by the person in the second image or video based on lighting conditions or properties of the first image or video.

In one example, in order to generate the image or video that retains the motion of a person in a first image but that has an appearance in which an upper-body garment is replaced to copy an upper-body garment worn by another person in a second image or video, the image rendering module 518 generates or renders one or more intermediate images or videos. Specifically, the image rendering module 518 can generate an intermediate image or video by applying motion features of the given person depicted in the first training image or video and appearance features of the given person depicted in the second training image or video to a neural network. The neural network renders an intermediate image or video based on the received motion and appearance features to depict the given person in the second training image or video performing a motion or pose of the given person in the first training image or video. In this way, the intermediate image can represent the given person in the second training image or video as wearing the same upper-body garment but in a different pose or motion corresponding to the pose or motion of the given person in the first training image or video.

The intermediate image or video is applied to an upper-body segmentation module 515. The upper-body segmentation module 515 implements a neural network that is trained to generate an upper-body segmentation of the articles of clothing worn by a person depicted in an image or video. In some cases, the upper-body segmentation module 515 is implemented by the first machine learning technique. In these cases, the upper-body segmentation is provided as part of the appearance features extracted by the first machine learning technique. In some cases, the upper-body segmentation module 515 is implemented by the second machine learning technique. The upper-body segmentation module 515 outputs the segmentation that identifies the borders or regions of the intermediate image of the upper-body outfit or upper-body garment worn by the given person. The upper-body segmentation module 515 can also apply a mask based on the upper-body segmentation to obtain a set of pixels (values and positions) representing the upper-body garment worn by the given person in the intermediate image. These obtained set of pixels are used by the image rendering module 518 to replace the corresponding set of pixels in the first training image or video of the given person. This results in the new image or video that retains the motion of the person in the first training image but that has an appearance in which an upper-body garment is replaced to copy an upper-body garment worn by the given person in the second training image or video.

The motion and appearance transfer system 224 compares the generated or estimated new image or video with the second training image or video to compute a deviation. Specifically, during training the motion and appearance transfer system 224 renders an image or video that approximates the second training image or video in which the person depicted in the first training image is wearing a different upper-body garment. Namely, the motion and appearance transfer system 224 adapts the appearance and motion of the same person that is depicted in the first training image wearing one upper-body garment to match a different upper-body garment of the same person that is depicted in the second training image. Based on how close the rendered image or video is to the second training image or video, the motion and appearance transfer system 224 makes a determination to complete training.

In an example, the motion and appearance transfer system 224 updates one or more parameters of the first and/or second machine learning techniques based on the computed deviation. The motion and appearance transfer system 224 determines if the computed deviation is within a threshold error or if a certain number of iterations or epochs have been performed to determine if a stopping criterion is met. In response to determining that the stopping criterion has been met, the motion and appearance transfer system 224 completes training and the parameters and coefficients of the machine learning techniques are stored in the trained machine learning technique(s) 307. In response to determining that the stopping criterion has not been met, the motion and appearance transfer system 224 obtains a second pair of training images or videos that depict the same person wearing the different upper-body articles of clothing and performing different motions or poses. The motion and appearance transfer system 224 iterates through the above training process to render a new image in which upper-body garments worn by the person in one of the training images or videos is modified to mirror or copy the upper-body garments worn by the person in a second of the training images or videos. Parameters of the first and/or second machine learning techniques are again updated and a deviation is computed to determine whether a stopping criterion is met.

In this way, the motion and appearance transfer system 224 trains the machine learning technique modules to establish a relationship between the appearance and motion of a person in a first image or video, the appearance and motion of a person in a second image or video, and a rendered image or video of the person in the first image or video wearing a different upper-body garment corresponding to the upper-body garment worn by the second person in the second image or video.

After the motion and appearance transfer system 224 trains the first and second machine learning technique modules, the motion and appearance transfer system 224 can receive a new pair of images. The motion and appearance transfer system 224 can generate a new image in which the appearance of a person in one of the new pair of images is modified to have the upper-body garment being worn by the person changed to match an upper-body garment worn by the person in a second one of the new pair of images. Particularly, the motion and appearance transfer system 224 can receive input from a first person that selects a first image or video that depicts the first person performing a first motion and wearing a first upper-body garment. The AR effect module 519 can receive input from the first person that activates the AR experience in which an upper-body garment of another person in a target image or video is used to modify the first upper-body garment worn by the first person in the first image or video. In response, the motion and appearance transfer system 224 receives the target image or video that depicts a second person wearing a second upper-body garment and performing a second motion or pose. The motion and appearance transfer system 224 can extract the motion features of the first person depicted in the first image or video and can extract the appearance features of the second person depicted in the target image or video. The motion and appearance transfer system 224 applies the appearance features and the motion features to the second neural network (e.g., an image rendering module 518).

The image rendering module 518 renders an intermediate image or video that depicts the second person wearing the second upper-body garment and performing the first motion or pose of the first person. In some examples, the image rendering module 518 renders the intermediate image or video based on 3D body tracking information obtained from the 3D body tracking module 513 and an upper-body segmentation obtained from the upper-body segmentation module 515. The 3D body tracking module 513 can continuously track the movement of the first person depicted in the first image or video to enable the image rendering module 518 to continuously and in real time update the motion or pose of the second person depicted in the second image or video. The upper-body segmentation module 515 can continuously generate an upper-body segmentation of the first person depicted in the first image or video to enable the image rendering module 518 to continuously and in real time update the motion and appearance of the second person in the intermediate image or video.

The image rendering module 518 applies an upper-body garment segmentation to the intermediate image or video to generate an upper-body garment segmentation. Namely, after the intermediate image or video is generated to depict the second person wearing the second upper-body garment in the pose of the first person depicted in the first image or video, the upper-body garment segmentation of the second person can be generated. A mask is then applied to the upper-body garment segmentation to obtain the pixels corresponding to the upper-body garment worn by the second person. The obtained pixels are then used by the image rendering module 518 to render a new image or video based on the first image or video in which the first person is depicted as wearing the second upper-body garment worn by the second person in the second image or video. In one example, the image rendering module 518 copies and pastes the obtained pixels of the second upper-body garment from the mask generated based on the intermediate image or video to corresponding pixel positions of the first video that depicts the first person wearing the first upper-body garment. This results in a depiction of the first person wearing the second upper-body garment. In some cases, before pasting the obtained pixels, the image rendering module 518 modifies the pixel values of one or more portions based on lighting conditions of the first image or video.

FIG. 6 is a diagrammatic representation of outputs of the motion and appearance transfer system 224, in accordance with some examples. Specifically, FIG. 6 shows a 3D body mesh 600 extracted by the first machine learning technique module (e.g., the appearance extraction module 512 and the motion extraction module 514). The 3D body mesh 600 can be associated with one or more appearance and/or motion features that are also extracted by the first machine learning technique module. In one example, the one or more appearance and/or motion features can include a three-dimensional (3D) pose of a person depicted in one of the images or videos, an upper-body segmentation, a set of dense keypoints, texture, color, and/or an upper-body garment segmentation of the person depicted in the images or videos.

Figure 7:
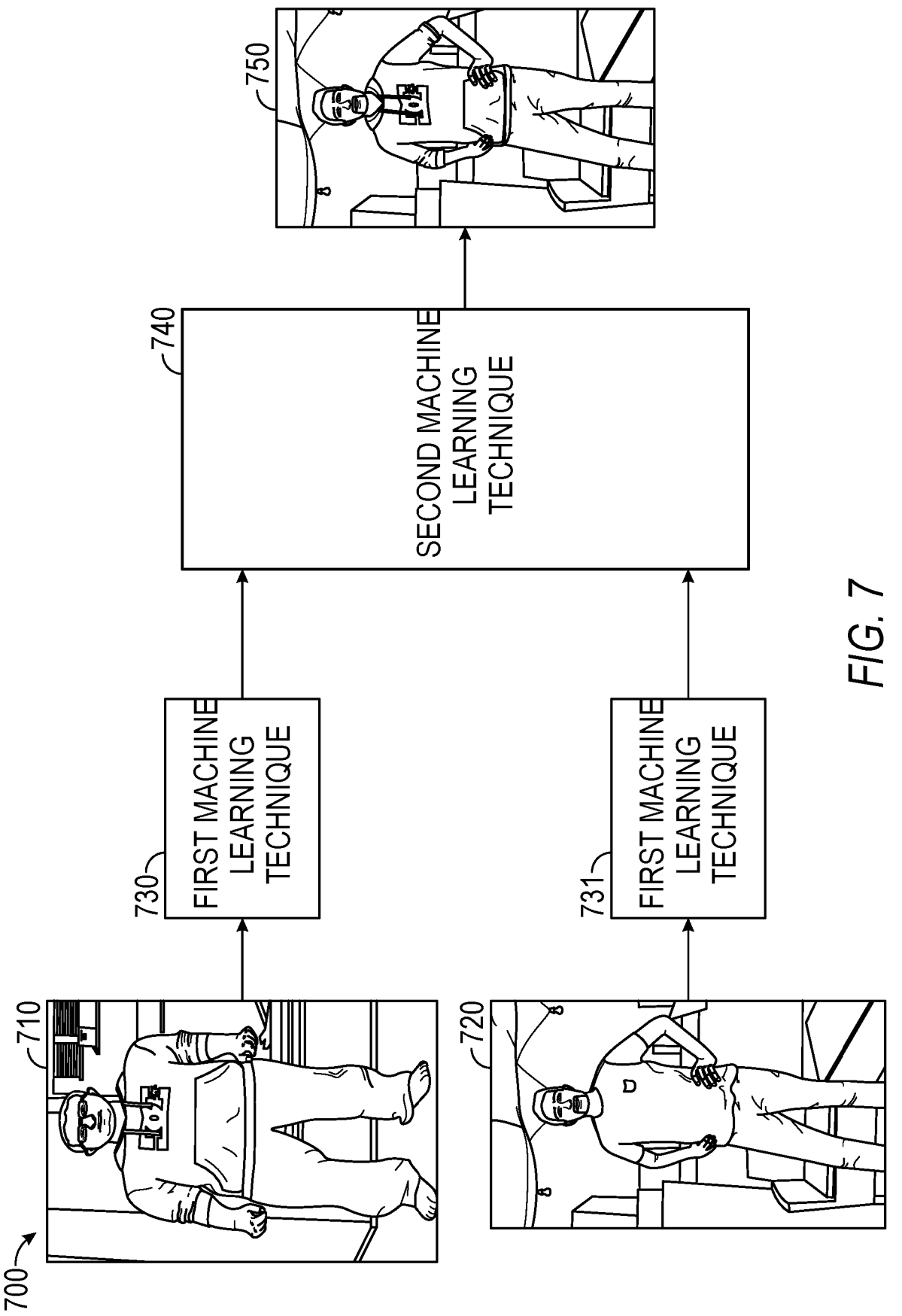

In one example, as shown in diagram 700 of FIG. 7, motion and appearance transfer system 224 can receive a first image or video 710, such as from a rear-facing camera of a client device 102 of a first person. The first image or video 710 depicts a second person performing a first motion wearing a first upper-body garment (e.g., a shirt). The motion and appearance transfer system 224 can receive a second image or video 720, such as from a front-facing (or rear-facing) camera of the client device 102 of the first person. The second image or video 720 can depict the first person performing a second motion and wearing a second upper-body garment (e.g., a second shirt).

The first image or video 710 can be received at the same time as the second image or video 720. In this case, the front-facing and rear-facing cameras of the client device 102 of the first person can be active at the same time. The display of the client device 102 can display the image or video captured by the front-facing camera in one region of the screen and the image or video captured by the rear-facing camera in a second region of the screen. The regions can overlap such that the image or video captured by the front-facing camera is displayed on top of the image or video captured by the rear-facing camera, such as in a top or bottom corner.

In one example, the first image or video 710 and second image or video 720 can be received and captured in real time together. In one example, the second image or video 720 can be initially captured and received before capturing the first image or video 710. In one example, the first image or video 710 can be initially captured and received before capturing the second image or video 720.

The motion and appearance transfer system 224 can apply a first instance 730 of the first machine learning technique to the first image or video 710. The first instance 730 of the first machine learning technique can extract appearance features from the first image or video 710. The appearance features represent how the second person looks in the first image or video 710 including a texture and color of the second person and the upper-body garment segmentation of the second person. The motion and appearance transfer system 224 can apply a second instance 731 of the first machine learning technique to the second image or video 720. The second instance 731 of the first machine learning technique can extract motion features from the second image or video 720. The motion features represent how the first person moves in the second image or video 720 including a 3D body pose and 3D upper-body segmentation of the first person.

The motion and appearance transfer system 224 applies, to a second machine learning technique 740, the appearance and motion features extracted from the first and second images or videos 710 and 720. The second machine learning technique 740 renders a new image or video 750 that depicts the first person having an appearance of the first person and wearing the second upper-body garment worn by the second person depicted in the first image or video 710. The new image or video 750 can be displayed together with the first and second images or videos 710 and 720 on the same client device 102 so the first person can see the changes to the first person's upper-body garments in real time.

FIG. 8 is a flowchart of a process 800 performed by the motion and appearance transfer system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 801, the motion and appearance transfer system 224 (e.g., a client device 102 or a server) receives a first video that includes a depiction of a first person wearing a first upper-body garment in a first pose, as discussed above. For example, a second image or video 720 can be received from a front-facing camera of a client device 102 of a first person that depicts the first person wearing a first upper-body garment and in a first pose.

At operation 802, the motion and appearance transfer system 224 obtains a second video that includes a depiction of a second person wearing a second upper-body garment in a second pose, as discussed above. For example, a first image or video 710 can be received from a rear-facing camera of a client device 102 of the first person that depicts a second person wearing a second upper-body garment and in a second pose.

At operation 803, the motion and appearance transfer system 224 modifies a pose of the second person depicted in the second video from the second pose to the first pose to match the first pose of the first person depicted in the first video, as discussed above. For example, the second machine learning technique 740 can generate or render an intermediate image or video in which the pose of the second person is modified to mirror or copy the pose of the first person depicted in the second image or video 720. The intermediate image or video can be generated or rendered based on motion and appearance features extracted by the first machine learning technique instances 730 and 731 from the first and second images or videos 710 and 720.

At operation 804, the motion and appearance transfer system 224 generates an upper-body segmentation of the second upper-body garment which the second person is wearing in the second video in the modified pose, as discussed above. For example, the second machine learning technique 740 can apply an upper-body segmentation to the intermediate image or video to generate an upper-body segmentation of the second upper-body garment worn by the second person that represents the borders of the second upper-body garment.

At operation 805, the motion and appearance transfer system 224 replaces the first upper-body garment worn by the first person in the first video with the second upper-body garment based on the upper-body segmentation, as discussed above. For example, the second machine learning technique 740 can obtain the pixels from the segmentation of the second upper-body garment to modify the corresponding pixel values of the second image or video 720. This results in a new image or video that depicts the first person wearing the second upper-body garment instead of the first upper-body garment.

Machine Architecture

Figure 9:
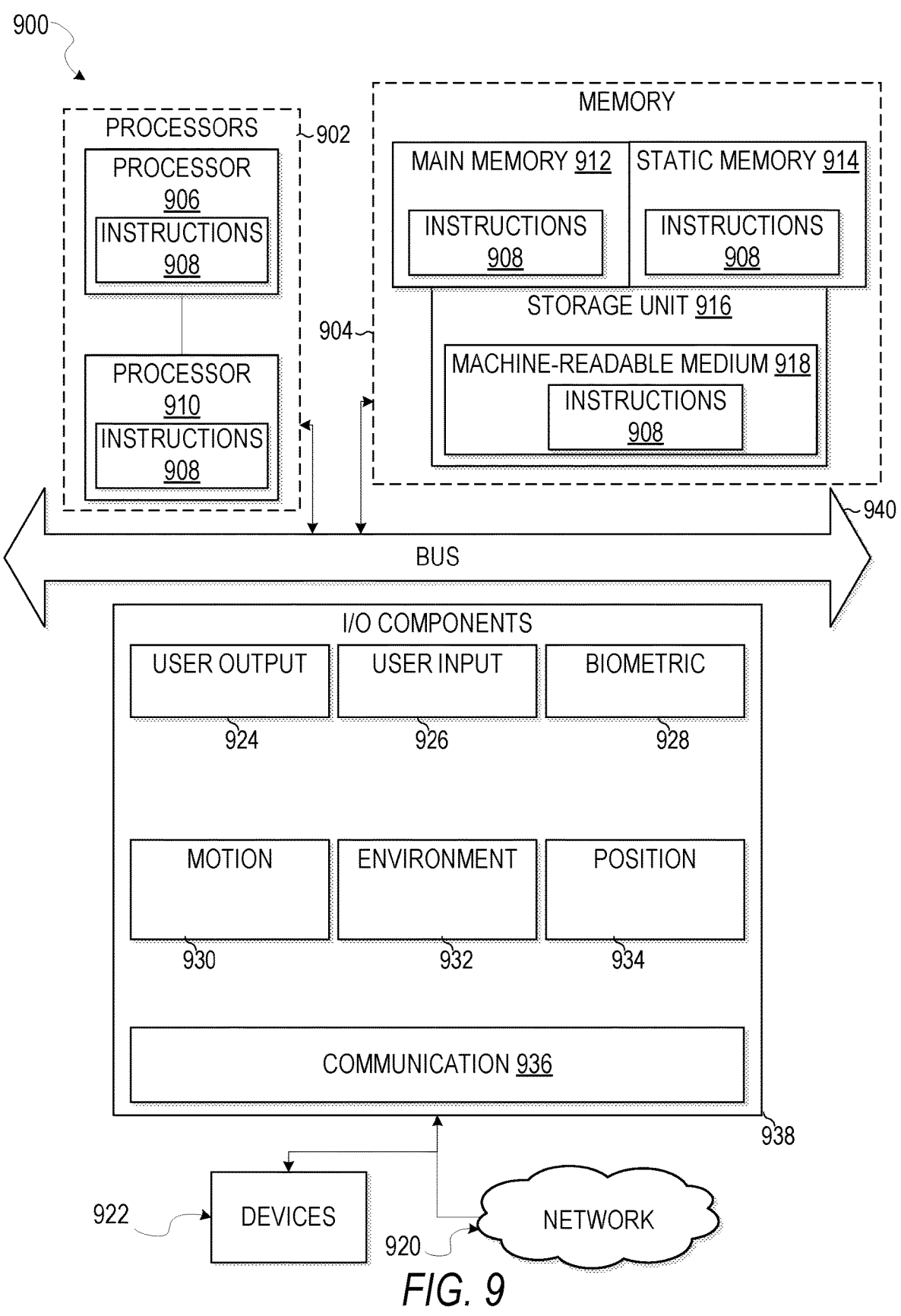
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC)

Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., HTTP). Similarly, the instructions 908 may be transmitted or received using a transmission medium via a coupling (e.g., a peer-to-peer coupling) to the devices 922.

Software Architecture

Figure 10:
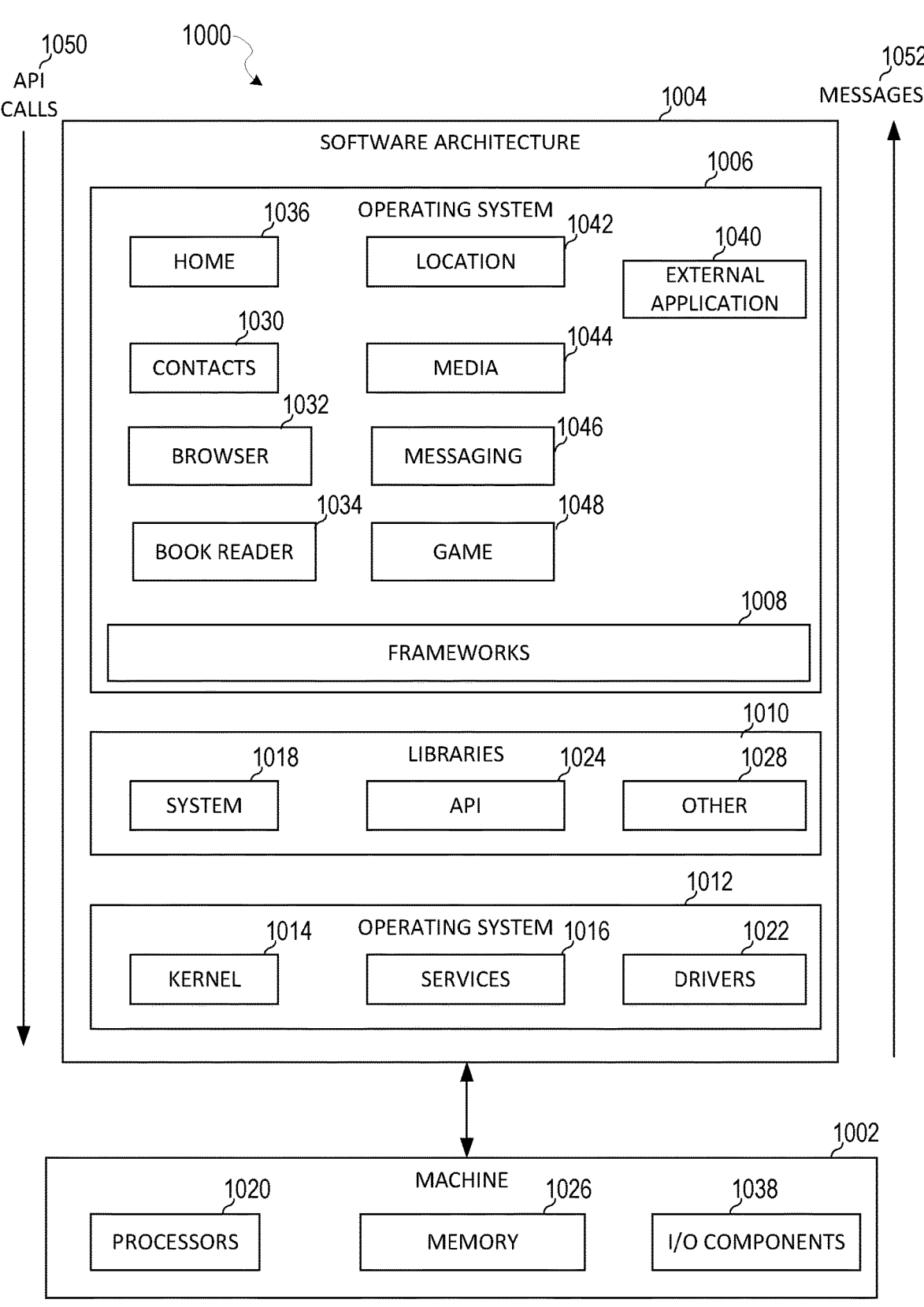
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm).

In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:

receiving, by one or more processors, a first video that includes a depiction of a first person wearing a first garment in a first pose;

obtaining a second video that includes a depiction of a second person wearing a second garment in a second pose;

generating a third video that includes a depiction of the second person having appearance data associated with the second person and motion data of the first person; and replacing a depiction of the first garment worn by the first person in the first video with the second garment based on the third video.

2. The method of claim 1, further comprising:

modifying the second pose of the second person depicted in the second video to match the first pose of the first person depicted in the first video;

extracting the appearance data associated with the second person from the second video; and extracting the motion data associated with the first person from the first video.

3. The method of claim 1, further comprising:

modifying motion data associated with the second person to match the motion data associated with the first person;

applying a mask to the appearance data associated with the second person after modifying the motion data associated with the second person to obtain pixels corresponding to the second garment; and generating a fourth video that includes a depiction of the first person wearing the second garment instead of the first garment.

4. The method of claim 3, further comprising:

copying the pixels corresponding to the second garment to a set of target pixels.

5. The method of claim 1, further comprising:

after modifying the second pose of the second person to match the first pose of the first person, generating a segmentation of the second garment.

6. The method of claim 5, further comprising:

applying a mask to the third video to obtain a set of pixels corresponding to the second garment; and copying pixels within the mask to corresponding pixel positions in the first video to generate a fourth video that includes a depiction of the first person wearing the second garment instead of the first garment.

7. The method of claim 1, further comprising extracting appearance data and the motion data associated with the first person and the appearance data and motion data associated with the second person by applying a first machine learning model to the first video and the second video, the first machine learning model being trained to estimate appearance data and motion data associated with an input video.

8. The method of claim 7, wherein the first machine learning model is trained to generate a three-dimensional (3D) pose of a given real-world object depicted in the input video, an upper-body body segmentation of the given real-world object, a set of dense keypoints of the given real-world object, texture, color, and an upper-body garment segmentation of the given real-world object simultaneously.

9. The method of claim 7, further comprising training the first machine learning model by iterating through a sequence of operations comprising:

receiving a first training video that depicts a training person in a first training pose and wearing a first training garment;

receiving a second training video that depicts the training person in a second training pose and wearing a second training garment;

applying the first machine learning model to the first training video and the second training video to generate first and second sets of estimated appearance data and motion data associated with the training person; and applying the first and second sets of estimated appearance data and motion data associated with the training person to a second machine learning model to generate a depiction of the training person wearing the second training garment.

10. The method of claim 9, further comprising:

computing a deviation between the depiction of the training person wearing the second training garment and the second training video that depicts the training person wearing the second training garment; and updating one or more parameters of the first machine learning model and the second machine learning model based on the deviation.

11. The method of claim 10, wherein the first machine learning model comprises an appearance data and motion data extraction module and the second machine learning model comprises an image generator module.

12. The method of claim 1, further comprising:

applying the motion data associated with the first person extracted from the first video and the appearance data associated with the second person extracted from the second video to a machine learning model, the machine learning model being trained to apply a motion of a third person to an appearance of a fourth person and to render a new video that depicts the third person wearing a garment of the fourth person.

13. The method of claim 1, further comprising:

capturing the second video that depicts the second person using an image capture device of a device of the first person; and after capturing the second video, capturing the first video that depicts the first person using the image capture device, wherein the third video is generated in response to capturing the first video after capturing the second video, the third video depicting the first person wearing the second garment being worn by the second person.

14. The method of claim 13, wherein the second video is captured using a rear-facing camera of the device and the first video is captured using a front-facing camera of the device.

15. The method of claim 1, wherein the first video and the second video are captured simultaneously using different cameras of a device.

16. The method of claim 1, wherein the third video depicting a change in appearance of the first person is generated in real-time as the first video and the second video are being captured.

17. The method of claim 1, further comprising:

obtaining lighting conditions associated with the first video;

extracting the second garment in the second pose of the second person based on a segmentation;

modifying one or more colors of the second garment based on the lighting conditions associated with the first video; and applying the second garment with the one or more colors to an appearance data associated with the first person in the first video.

18. A system comprising:

at least one processor; and a memory component having instructions stored thereon that, when executed by the at least one processor, cause the at least one processor to perform operations comprising:

receiving a first video that includes a depiction of a first person wearing a first garment in a first pose;

obtaining a second video that includes a depiction of a second person wearing a second garment in a second pose;

generating a third video that includes a depiction of the second person having appearance data associated with the second person and motion data of the first person; and replacing a depiction of the first garment worn by the first person in the first video with the second garment based on the third video.

19. The system of claim 18, the operations comprising:

obtaining lighting conditions associated with the first video;

extracting the second garment in the second pose of the second person based on a segmentation;

modifying one or more colors of the second garment based on the lighting conditions associated with the first video; and applying the second garment with the one or more colors to an appearance data associated with the first person in the first video.

20. A non-transitory computer-readable storage medium having stored thereon instructions that, when executed by a processor, cause the processor to perform operations comprising:

receiving a first video that includes a depiction of a first person wearing a first garment in a first pose;

obtaining a second video that includes a depiction of a second person wearing a second garment in a second pose;

generating a third video that includes a depiction of the second person having appearance data associated with the second person and motion data of the first person; and replacing a depiction of the first garment worn by the first person in the first video with the second garment based on the third video.

* * * * *